United States Patent [19]

Shwarts et al.

[11] Patent Number: 5,524,201
[45] Date of Patent: Jun. 4, 1996

[54] METHOD OF PREPARING AN ELECTRONIC BOOK FOR A COMPUTER SYSTEM

[75] Inventors: Scott L. Shwarts, Scottsdale, Ariz.; David R. Dunham, Seattle, Wash.

[73] Assignee: Apple Computer, Inc., Cupertino, Calif.

[21] Appl. No.: 147,055

[22] Filed: Nov. 3, 1993

[51] Int. Cl.⁶ .................................................. G06E 3/14
[52] U.S. Cl. ........................ 395/161; 395/155; 395/145
[58] Field of Search .................................. 395/155, 161, 395/159, 157, 145; 345/145, 179; 364/237.1, 927.6

[56] References Cited

U.S. PATENT DOCUMENTS

| | | | |
|---|---|---|---|
| 5,054,096 | 10/1991 | Beizer | 382/41 |
| 5,199,104 | 3/1993 | Hirayama | 395/145 |
| 5,237,651 | 8/1993 | Randall | 395/157 X |
| 5,283,864 | 2/1994 | Knowlton | 395/158 |
| 5,341,293 | 8/1994 | Vertelney et al. | 395/159 |
| 5,347,295 | 9/1994 | Agulnick et al. | 345/179 X |
| 5,377,281 | 12/1994 | Ballard et al. | 382/40 |
| 5,392,387 | 2/1995 | Fitzpatrick et al. | 395/159 X |
| 5,398,310 | 3/1995 | Tchad et al. | 395/155 X |
| 5,404,442 | 4/1995 | Foster et al. | 395/159 |

OTHER PUBLICATIONS

O'Connor, Rory J., "Apple Banking on Newton's Brain", Apr. 22, 1992, San Jose Mercury News.
Weiman, Liza and Moran, Tom, "A Step Toward the Future", Aug. 1992, Macworld Magazine, pp. 129–131.
Soviero, Marcelle M., "Your World According to Newton", Sep. 1992, Popular Science Magazine, pp. 46–49.
Abatemarco, Fred, "From the Editor", Sep. 1992, Popular Science Magazine, p. 4.

*Primary Examiner*—Raymond J. Bayerl
*Assistant Examiner*—Crescelle N. dela Torre
*Attorney, Agent, or Firm*—Hickman Beyer & Weaver

[57] ABSTRACT

A method and system for preparing interactive references having pages which can be displayed on the screen of a pointer-based computer system. Some of the reference's pages have "live" features or icons which the user can select to cause various actions such as moving to other locations within the reference, displaying dialog boxes on the screen, etc. The present invention converts a document containing appropriate comments into a set of instructions for an interactive reference according to a defined sequence of steps. First, the document is separated into content blocks delineated by content commands. Each such block can be separately formatted for use in the interactive reference. Next, the system creates page descriptions in which the content blocks are arranged on pages whose boundaries are defined by the display screen of the computer system on which the interactive references will be displayed. In addition, the system prepares instructions for treating pointer actions on buttons and other live screen features. Finally, commands describing the interactive reference, are output. The commands will be provided a format, at least when compiled, that can be stored and processed in the computer on which the interactive reference is displayed.

31 Claims, 21 Drawing Sheets

Newton 800#'s

Domestic Air Carriers

International Air Carriers

Auto Rental Agencies

Hotels. Motels Inns

Epress Mail Package Service

Flowers, Gourmet Food & Gifts

Domestic Air Carriers

☎ Newton 800 Numbers ☎

| | |
|---|---|
| Alaska | (800) 426-0333 |
| Aloha Airlines | (800) 227-4900 |
| America West | (800) 247-5692 |
| American | (800) 433-7300 |
| Continental | (800) 525-0280 |
| Delta | (800) 221-1212 |
| Mesa Airlines | (800) 637-2247 |
| Midwest Express | (800) 452-2022 |
| Northwest | (800) 225-2525 |
| Southwest | (800) 531-5601 |
| Trans World | (800) 221-2000 |
| US Air | (800) 428-4322 |
| United | (800) 241-6522 |

*9:45, Flgt.610* — 368
*9:20, Flight 309* — 366

FIG. 9

C36 := Text: "Text Stream Here..." —209
   Styles: [15,51,10,52,11,57...] —210
   Tabs: ...
   Layout: Centered, Borders,... —212
   Script: {Script associated with Text} —211
   Color: Blue
   Phone: 411

C37 := Icon: [Instructions for Graphic] —214
   Layout: Side-by-Side —216
   Script: {Script associated with Graphic} —217
   Food: Sushi
   City: Scottsdale

METHOD OF PREPARING AN ELECTRONIC BOOK FOR A COMPUTER SYSTEM

BACKGROUND OF THE INVENTION

The present invention relates generally to methods and apparatus for preparing interactive documents or books for use in pointer-based computer systems such as pen-based computers. The interactive documents may have one or more tools for navigating through their contents quickly. The contents in such documents may include text, graphics, "live" action templates, etc.

A pen-based computer is a small, often hand-held, computer system where the primary method for inputting data includes a "pen" or stylus. A typical pen-based computer system is housed in a generally rectangular enclosure, and has a dual-function display assembly providing a viewing screen along one of the planar sides of the enclosure. The dual-function display assembly serves as both an input device and an output device. When operating as an input device, the display assembly senses the position of the tip of the stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function display assemblies of pen-based computer systems permit users to operate the computers as a computerized notepads. For example, graphical images can be input into the pen-based computer by merely moving the stylus on the surface of the screen. As the CPU senses the position and movement of the stylus, it generates a corresponding image on the screen to create the illusion that the stylus is drawing the image directly upon the screen. With suitable recognition software, text and numeric information can also be entered into the pen-based computer system in a similar fashion.

Such computer systems have many uses: they can be used to jot down notes at meetings, organize to-do lists, send and receive information by faxing, electronic mail, etc. Because computer systems such as these are an integral part of many user's lives, it would also be desirable if they could be used to store and display book-like information such as novels and reference materials (i.e., electronic books). This would be especially desirable in pen-based computer systems which recognize handwritten instructions and allow the user to scribble handwritten notes and interact with "live" screens which might be incorporated into the books.

Suitable materials for use as "electronic books" might include interactive almanacs, encyclopedias, and other reference materials such as lists of phone numbers for various consumer services or government agencies. Unfortunately, books and reference materials such as these can become large and unwieldy, especially without careful organization. Thus, it would be useful to have tools for navigating throughout the content of an electronic book. "Find" methods are now available for searching all text content to locate specific character strings within a document, but these methods are often too slow or unfocused to quickly take the user to a desired location. It would therefore be desirable to include in electronic books one or more high-level navigation systems that quickly show the user where he or she is located within the book, what other material is available in the book, and how to get to other locations in the book. It would be especially desirable if a system was available for easily converting electronically stored information such as word processing documents into electronic books having complete navigation systems as described. Such books could then be "read" on pen or pointer-based computers.

SUMMARY

The present invention provides a method and system for quickly and easily preparing references having pages which can be displayed on the screen of a pointer-based computer system. Some of the reference's pages will have "live" features or icons which can be selected by a user to cause various actions such as moving to other locations within the reference, displaying dialog boxes on the screen, etc. Because the user can interact with live screens (via a stylus or other pointer), the references prepared in accordance with this invention are referred to herein as "interactive references." In preferred embodiments, the interactive reference will have navigation dialog boxes and table of contents or "browser" windows which allow the user to quickly and easily move throughout the reference's content. The navigation dialog box will preferably include buttons for creating bookmarks and returning to a menu page. The menus referred to here are menu or "kiosk" pages that include lists of destinations within the book. If the reader is lost, he or she can jump to the nearest prior menu page by selecting the return to menu button from the navigation dialog box. The system will then automatically move to the first menu page preceding the currently displayed page.

A particular advantage of the present invention is the ease with which it allows an author to prepare an interactive reference. The author simply inserts certain recognized commands within the content of conventional word processing/graphics documents. The system then processes these commands and the associated document content to produce a completed interactive reference according to this invention. The commands used to prepare an interactive reference can be grouped according to their function. For example, some commands specify attributes of the document such as its title, author, copyright, etc. Other commands specify attributes and/or functions of browsers and menu pages. Still other commands specify the beginning of a new section or content block within the document. These commands can also indicate the type of content such as text, graphics, templates for live action, etc.

In a preferred embodiment, the present invention converts a document containing appropriate commands into a set of instructions for an interactive reference by the following steps. First, the document is separated into content blocks delineated by content commands. Each such block may contain specialized information such as attributes of the block and how it is to be formatted. Preferably, at least some of the content blocks contain templates for live interaction between a pointer and the display screen. Next, the system creates page descriptions in which the content blocks are arranged on pages whose boundaries are defined by the display screen of the computer system on which the interactive references will ultimately be displayed. In addition, the system prepares instructions for treating pointer actions on buttons and other live screen features. Finally, commands describing the interactive reference, are output in a format, at least when compiled, that can be stored and processed in the computer on which the interactive reference is to be displayed.

These and other features of the present invention will be presented in more detail in the following specification of the invention and associated figures.

BRIEF DESCRIPTION OF THE DRAWINGS

FIG. 9 is an illustration of a screen display in which a book page has had handwritten notes provided thereon;

FIG. 11 is a block diagram showing the modules used to prepare an interactive reference according to;

Detailed Description of the Preferred Embodiments

I. GENERAL

The books or interactive references prepared according to the present invention are well suited for use in pointer based computer systems such as the pen-based, pen-aware and mouse controlled systems that are currently popular. For the purposes of illustration, the invention will be described in connection with a pen-based system.

Figure 1:
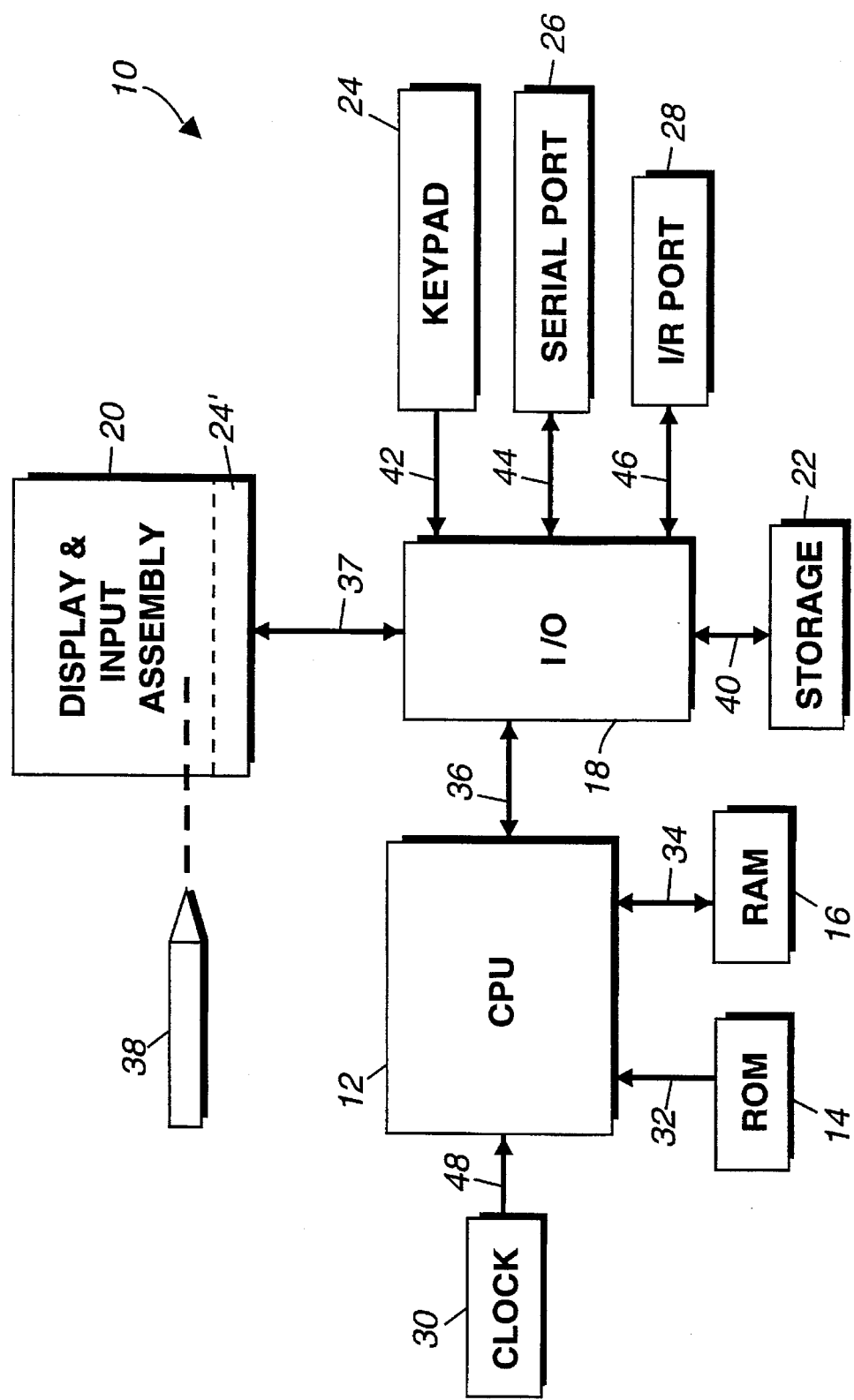
FIG. 1 is a block diagram of a pen-based computer system used run interactive reference books prepared according to this invention.

FIG. 1 shows a pen-based computer system 10 suitable for displaying an interactive reference of this invention. The computer system used to actually prepare an interactive reference according to this invention may be the same or a different computer that described below in connection with FIG. 1. Typically, however, the interactive reference is prepared on a different computer that may not even be a pen or pointer-based computer system. Generally, the computer used for preparation includes the same elements shown in FIG. 1 but need not contain a stylus 38 or communication ports (i.e., serial port 26 and IR port 28). In a particularly preferred embodiment, the computer used for preparation is a Macintosh computer made by Apple Computer Inc., of Cupertino Calif.

As shown in FIG. 1, the pen-based computer system 10 includes a central processing unit (CPU) 12, read only memory (ROM) 14, random access memory (RAM) 16, input/output (I/O) circuitry 18, and a display assembly 20. The pen-based computer system 10 may also optionally include a mass storage unit 22, a keypad (or keyboard) 24, a serial port 26, an infrared (I/R) port 28, and a clock 30.

The CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. CPU 12 is coupled to ROM 14 by a unidirectional data bus 32. ROM 14 preferably contains the basic operating system for the pen-based computer system 10. CPU 12 is connected to RAM 16 by a bi-directional data bus 34 to permit the use of RAM 16 as scratch pad memory. ROM 14 and RAM 16 are also coupled to CPU 12 by appropriate control and address busses, as is well known to those skilled in the art. CPU 12 is coupled to the I/O circuitry 18 by bi-directional data bus 36 to permit data transfers with peripheral devices.

I/O circuitry 18 preferably includes a number of latches, registers and direct memory access (DMA) controllers. The purpose of I/O circuitry 18 is to provide an interface between CPU 12 and such peripheral devices as display assembly 20, mass storage 22, keypad 24, serial port 26, and I/R port 28.

Display assembly 20 of pen-based computer system 10 is both an input and an output device. Accordingly, it is coupled to I/O circuitry 18 by a bi-directional data bus 37. When operating as an output device, the display assembly 20 receives data from I/O circuitry 18 via bus 37 and displays that data on a suitable screen. The screen for display assembly 20 is preferably a liquid crystal display (LCD) of the type commercially available from a variety of vendors. The input device of display assembly 20 is preferably a thin, clear membrane which covers the LCD display and which is sensitive to the position of a stylus 38 on its surface. With such a structure, the membrane of the display assembly 20 can serve as an input "tablet." These position sensitive membranes are also commercially available. Alternatively, other types of tablets can be used, such as inductively coupled tablets. Combination display assemblies such as display assembly 20 which include both the LCD and the input membrane are commercially available from such vendors as Scriptel Corporation of Columbus, Ohio.

Some type of mass storage 22 is generally considered desirable. Mass storage 22 can be coupled to 1./0 circuitry 18 by a bi-directional data bus 40. However, the mass storage 22 can be eliminated by providing a sufficient amount of RAM 16 to store user application programs and data. In that case, RAM 16 can be provided with a backup battery to prevent the loss of data even when the pen-based computer system 10 is turned off. However, it is generally desirable to have some type of long term mass storage 22 such as a commercially available miniature hard disk drive, nonvolatile memory such as flash memory, battery backed RAM, a PCMCIA card, or the like.

Figure 2:
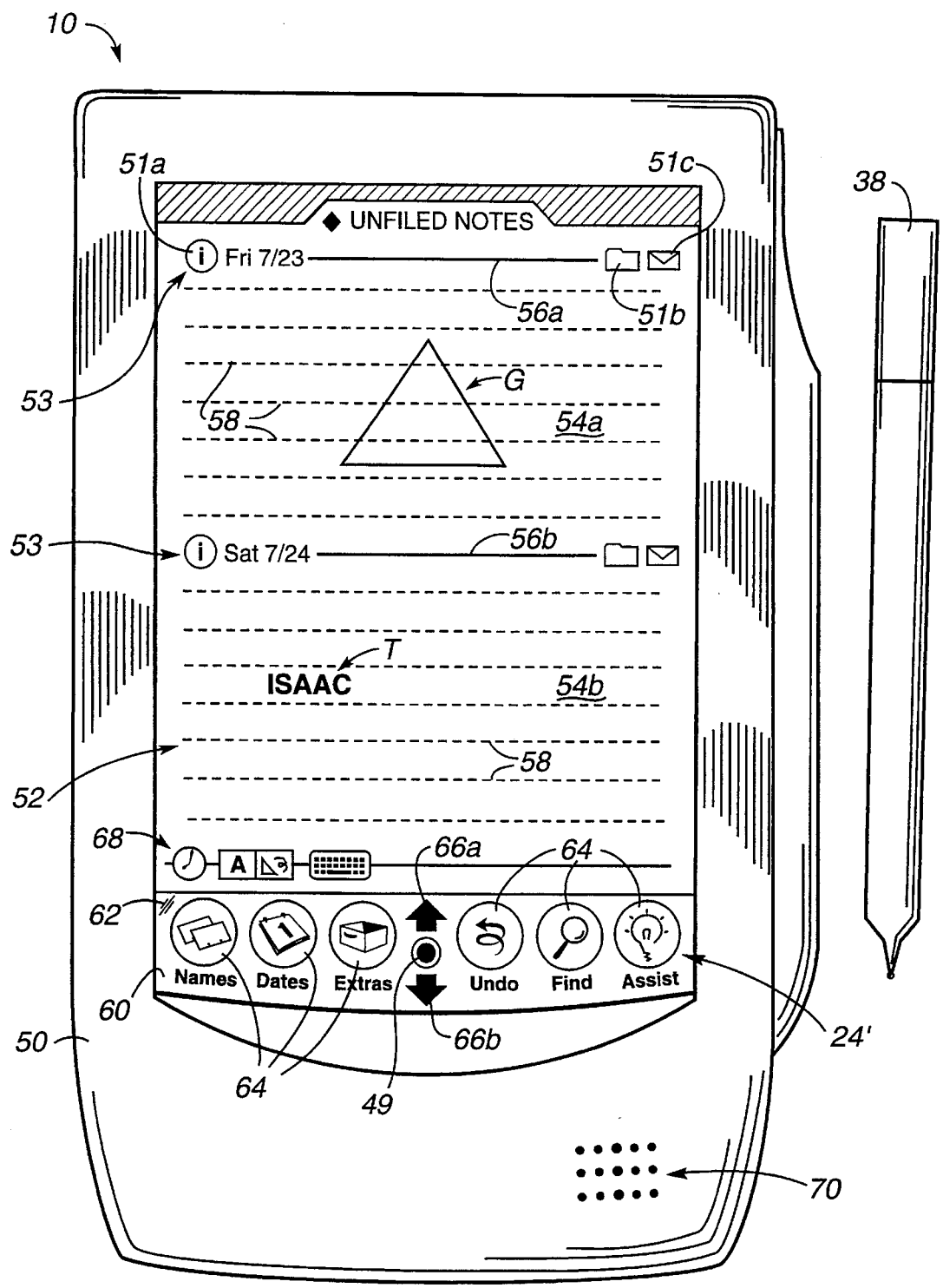
FIG. 2 is a pictorial representation of the display screen of the pen-based computer FIG. 1.

The keypad 24' can comprise an array of mechanical buttons or switches coupled to I/O circuitry 18 by a data bus 42. Alternatively, keypad 24' can comprise an entire, standard QWERTY keyboard. In the present embodiment, a separate keypad 24' is not used in favor of a "pseudo" keypad 24'. This "pseudo" keypad 24' comprises "button" areas which are associated with a bottom edge of the tablet membrane that extends beyond the lower edge of the LCD display. These button areas are defined by a printed or silk-screened icons which can be seen through the transparent membrane of the input tablet. When the "buttons" are selected by engaging the stylus 38 with the membrane over these printed icons, the membrane senses the pressure and communicates that fact to the CPU 12 via data bus 37 and I/O 18. An example of pseudo keypad 24' is shown in FIG. 2.

Other types of pointing devices can also be used in conjunction with the present invention. While the method of the present invention is described in the context of a pen-based system, other pointing devices such as a computer mouse, a track ball, or a tablet can be used to manipulate a pointer on a screen of a general purpose computer. Therefore, as used herein, the terms "pointer", "pointing device", "pointing means", and the like will refer to any mechanism or device for pointing to a particular location on a screen of a computer display.

Serial port 26 is coupled to I/O circuitry by a bi-directional bus 44. The serial port 26 can be used to couple the CPU to external devices and networks.

Infrared (I/R) port 28 is coupled to I/O circuitry by a bi-directional bus 46. The I/R port can be used for outgoing information (e.g. to control a printer or some other external device, or to communicate with other computer systems) or for incoming information from other computers or devices.

Clock 30 preferably comprises a real-time clock to provide real-time information to the system 10. Alternatively, clock 30 can simply provide regular clock pulses to, for example, an interrupt port of the CPU 12 which can count the clock pulses to provide the time function. However, this alternative clock embodiment tends to be wasteful of CPU processing power. Clock 30 is coupled to CPU 12 by a data bus 48.

In operation, information is input into the pen-based computer system 10 by "writing" on the screen of display assembly 20 with the stylus 38. Information concerning the location of the stylus 38 on the screen of the display assembly 20 is input into the CPU 12 via data bus 37 and I/O circuitry 18. Typically, this information comprises the Cartesian (i.e. x & y) coordinates of a pixel of the screen of display assembly 20 over which the tip of the stylus is positioned. Commercially available combination display assemblies such as the aforementioned assemblies available from Scriptel Corporation include appropriate circuitry to provide the stylus location information as digitally encoded data to the I/O circuitry of the present invention. The CPU 12 then processes the data under control of an operating system and possibly an application program stored in ROM 14, RAM 16, or mass storage 22. The CPU 12 next produces data which is transferred to the display assembly 20 via I/O circuitry 18 and data bus 37 to produce appropriate images on the screen portion of the display assembly 20.

In FIG. 2, the pen-based computer system 10 of FIG. 1 is shown housed within a generally rectangular enclosure 50. The CPU 12, ROM 14, RAM 16, I/O circuitry 18, and clock 30 are preferably fully enclosed within the enclosure 50. The display assembly 20 (FIG. 1) is mostly enclosed within the enclosure 50, but a viewing screen 52 of the display assembly is exposed to the user. As used herein, the term "screen" will refer to the portion of the display assembly 20 which can display an image that can be viewed by a user. Also accessible to the user is the pseudo keypad 24' that was described with reference to FIG. 1.

The enclosure 50 is preferably provided with apertures 70 which permit the free transmission of sound from a speaker (not shown) which is housed within enclosure 50. The speaker can be driven by the CPU 12, by I/O circuitry 18, or by specialized sound chips, as is well known to those skilled in the art. The speaker can be used to provide user feed-back, or to transmit audible information to a user.

Upon power-up, pen based computer system 10 displays on screen 52 an initial "note" area 54a including a header 53 and a number of guidelines 58. The header 53 preferably includes a header bar 56a, the date of creation of the note area 54a, and one or more icons and "soft" dedicated header function buttons 51A, 51B, and 51C. The optional guidelines 58 aid a user in entering text, graphics, and data into the pen-based computer system 10. A graphic object G in the form of a triangle is shown entered within note area 54a.

Additional note areas, such as a note area 54b, can be formed by drawing a substantially horizontal line across the screen 52 with the stylus 38. The substantially horizontal line is recognized by the system 10 and is converted into a second header bar 56b. Additional text, graphical, and other data can then be entered into this second note area 54b. For example, the text object T comprising "ISAAC" has been entered into second note area 54b.

In this preferred embodiment, the keypad 24', as explained previously, comprises a printed or silk-screened member 60 provided beneath a lower edge of a thin, clear, stylus-sensitive membrane 62 of the input "tablet." Alternatively, a keypad could comprise a mechanical keypad (or keyboard) 24, or a keypad could comprise "soft buttons" i.e. images generated at convenient locations on the screen 52, in which case a "button" would be activated by touching the stylus to the screen over the image of the button. The keypad 24' preferably includes a number of dedicated function buttons 64, an "overview button" 49, and a pair of scroll buttons 66a and 66b. The function buttons 64 include an address button ("Names"), a calendar button ("dates"), a drawer button ("extras"), an undo button, a find button, and an assist button. The operation of the note areas 54a, 54b, etc., scroll buttons 66a and 66b, and other aspects of computer system 10 are discussed in greater detail in U.S. patent application Ser. No. 07/868,013, filed Apr. 13, 1992, and U.S. patent application Ser. No. 08/127,21, filed on Sep. 24, 1993 and entitled "Method for Manipulating Notes on a Computer Display," both of which name Tchao et al. as inventors, are assigned to the assignee of the present invention and are incorporated herein by reference in its entirety.

A status bar 68 is provided at the bottom of the notepad application. The status bar 68 may be provided with a number of active and display areas. For example, U.S. patent application Ser. No. 07/976,970 filed Oct. 16, 1992 on behalf of Foster et. al, entitled "Status Bar for Application Windows" and assigned to the assignee of the present invention describes how to make and use the status bar for certain applications (e.g., a notepad application), and is incorporated herein by reference in its entirety.

The "Find" button is used to initiate a search for information. The undo button will undo the latest user action when depressed and will undo the last two actions if depressed a second time without the intervention of any additional user actions. The assist button gives the user access to a help menu which is designed to provide operating instructions to the user that may be helpful when the user is unsure of how to operate the computing system.

A "drawer", which is opened by pressing the drawer button ("extras") is used to store other application programs, tools, access buttons to external ROM cards, communications applications and other items that can be utilized by the user. When the drawer is "opened", a drawer dialog box is displayed on the screen 52. The user can then launch any application stored therein the associated icon that is displayed within the drawer dialog box. Thus, the icons serve as "soft buttons" which may be activated by tapping the screen at a location corresponding to the displayed position of the icon. Of course, in alternative embodiments, the particular applications that are accessed by keypad buttons can be varied widely. For example, additional keys could be added, existing keys removed, and/or the above described keys could be used to launch different applications.

Preferred embodiments of the present invention employ various "objects." As is well known to software developers, an "object" is a logical software unit comprising data and processes which give it capabilities and attributes. For example, an object can be queried as to its type and can return such data as the number of words that it contains, what its bounding box (BBOX) is, etc. Objects can contain other objects of the same or of a different type. Objects can also be used to project images on a screen according to their object type. Example of object types used in the following description include paragraph, line, and word objects. There are many well known texts which describe object oriented programming. See, for example, Object Oriented Programming for the Macintosh, by Kurt J. Smucker, Hayden Book Company, 1986.

In the present invention, objects are preferably implemented as part of a frame system that comprises frame objects related by a semantic network. A description of semantic networks can be found in "A Fundamental Tradeoff in Knowledge Representation and Reasoning", Readings in Knowledge Representation, by Brachman and Leveseque, Morgan Kaufman, San Mateo, 1985.

Another preferred tool for implementing the system of the present invention is a view system. Various types of view systems are well known to those skilled in the art. In the present system, the notepad application on the screen 52 forms a first or "root" layer, with the status bar 68, for example, positioned in a second layer "over" the root layer. The various buttons of the status bar 68 are positioned in a third layer "over" the second and root layers. The view system automatically handles "taps" and other gestures of the stylus 38 on the screen 52 by returning information concerning the tap or gesture and any object to which it may be related. Again, the status bar 68 and the view system is described in greater detail in copending U.S. patent application Ser. No. 07/976,970, which has been incorporated herein by reference. It is therefore clear that the object oriented programming and view system software makes the implementation of the processes of the present invention less cumbersome than traditional programming techniques. However, the processes of the present invention can also be implemented in alternative fashions, as will be well appreciated by those skilled in the art.

II. DISPLAYING AN INTERACTIVE REFERENCE

Details of the inventive procedure used to prepare the interactive reference will be provided below. First, however, the invention will be put in context by describing how an interactive reference prepared according to this invention can be displayed and manipulated by a user. The "content engine" which runs such interactive references is described in detail in U.S. patent application Ser. No. 08/147,143, filed on the same day as the present application, naming inventive entity, and entitled CONTENT ENGINE FOR A COMPUTER SYSTEM, which is incorporated herein by reference for all purposes.

Figure 3:
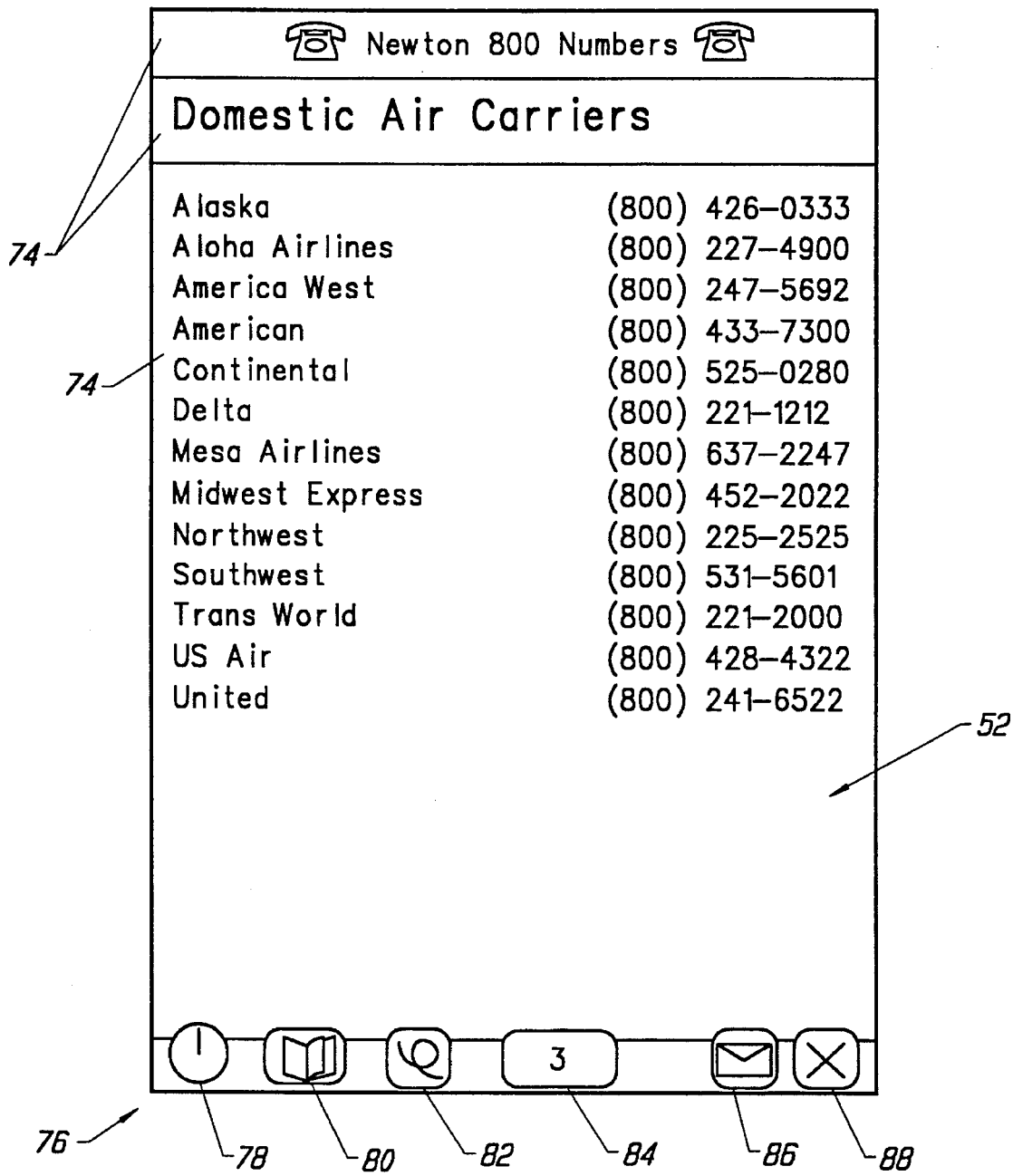
FIG. 3 is a representation of a computer screen displaying a page of an electronic book according to this invention.

Initially, the user selects a book he or she wishes to read by tapping on the "extras" or "drawer" button of keypad 24', an extras window then appears on the screen and lists any books which are installed in memory. After selecting a book to be read, the book is opened to a "current page." That is, a record in the book designated as "current page" is displayed on screen 52. A page of an exemplary book (containing a list of "800" phone numbers) is shown in FIG. 3. The particular page displayed includes the phone numbers of domestic air carriers. The "content" 74 of the displayed page includes the actual list of domestic air carriers and their phone numbers. In addition, the content includes a book title "Newton 800 Numbers" with two graphic representations of a telephone and a heading "Domestic Air Carriers" shown in reversed font style.

Displayed at the bottom of the current page is a status bar 76 associated with the content engine application. In preferred embodiments, the status bar will appear anytime a book is open. As shown, the status bar 76 includes a time button 78 (which when selected shows the date and time),.a bookmark button 80, a "mark-up" button 82, a page number button 84, a routing action button 86, and a close button 88. The functions of each of these buttons will be described in more detail below. In addition to the functions provided on status bar 76, the content engine can employ functions that are activated by the scroll buttons 66a and 66b, the overview button 49, and the various function buttons 64 (e.g., the undo button, the find button, and the assist button) previously discussed with reference to FIG. 2.

Figure 4:
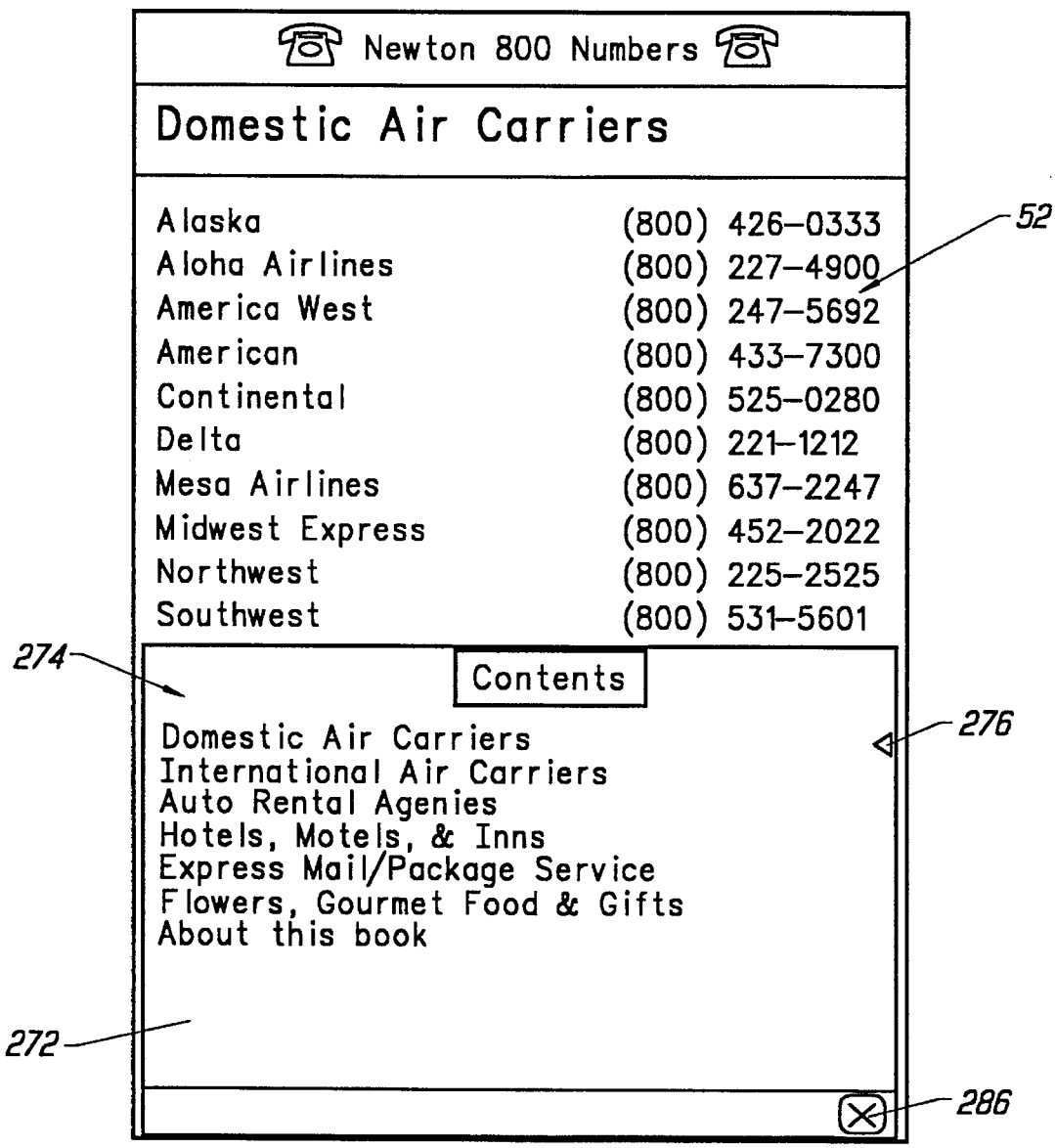
FIG. 4 is an illustration of a screen display showing a browser in accordance with this invention.

When the user selects the overview button 49, a table of contents or "browser" window 272 is displayed near the bottom of screen 52 as shown in FIG. 4. The contents include a list of "subjects" (categories of information) 274 found within the book as defined by the author. As shown in this example, a book of "800" phone numbers includes such subjects as international air carriers, auto rental agencies, and express mail/package services. At the right side of the contents window, a "You are Here" indicator 276 is displayed. The purpose of this indicator is to show the user where he or she is located with respect to other subjects within a current book. That is, the indicator shows the subject area in which the current page resides. As shown in the example of FIG. 4, the indicator is pointing to "Domestic Air Carriers," a list of which is the displayed on the current page. If the "You are Here" indicator moves to a different subject, the current page will become the first page within the new subject. In some embodiments, the "Contents" heading 275 at the top of the browser window takes the form of a menu that lists various browser formats. For example, in addition to the table of contents view, the browser could also provide an index view with page numbers. If the user taps on an index entry, the current page automatically becomes the page on which the index entry appears. Other formats will be apparent to those of skill in the art.

Users can navigate throughout the book to different subjects with the aid of a browser ("table of contents") window by either (1) selecting a given subject in the browser by, for example, tapping on it, or (2) scrolling through the subjects with scroll buttons 66a and 66b shown in FIG. 2.

Each time a new subject is selected by moving through the browser, two events take place: (1) the current (displayed) page becomes the first page available under the selected subject, and (2) the "You are Here" indicator moves such that it points to the selected subject. The browser window can be closed by selecting CLOSE button 286.

Figure 5:
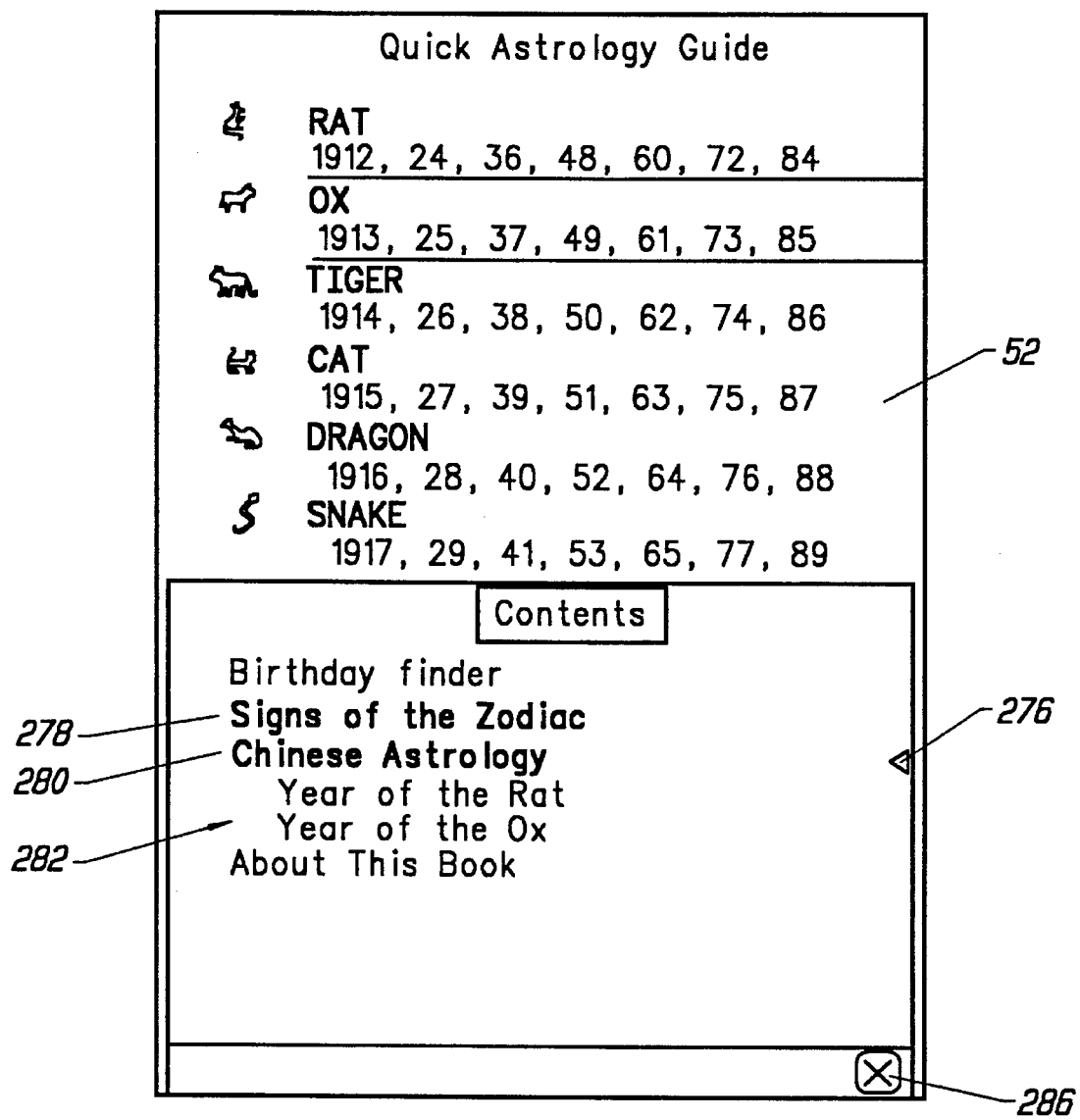
FIG. 5 is an illustration of a screen display showing a browser having subject entries with subcategories.

Some subjects displayed in the browser may contain subcategories which are displayed when the subject is selected. Subjects containing subcategories are generally shown in boldface as illustrated in FIG. 5. There, the subjects "Signs of the Zodiac" 278 and "Chinese Astrology" 280 are shown in boldface and therefore contain subcategories. In the example shown, "Chinese Astrology", has been selected and the subcategories "Year of the Rat" and "Year of the Ox" 282 have been displayed underneath the subject heading. If the category heading is selected a second time, the subcategories collapse into the category heading (i.e., they disappear). In addition, the currently displayed page reverts to the first page within the category heading (it may have a different page in the subcategory). In preferred embodiments, subcategories are displayed only if the subject under which they are included is directly selected by, e.g., tapping with a stylus. Thus, if a user scrolls through the various subjects listed in the contents window, the subcategories will not be displayed when the indicator button 276 points to a subject having subcategories. In alternative embodiments, subcategories will be displayed regardless of how the subjects are selected.

Figure 6:
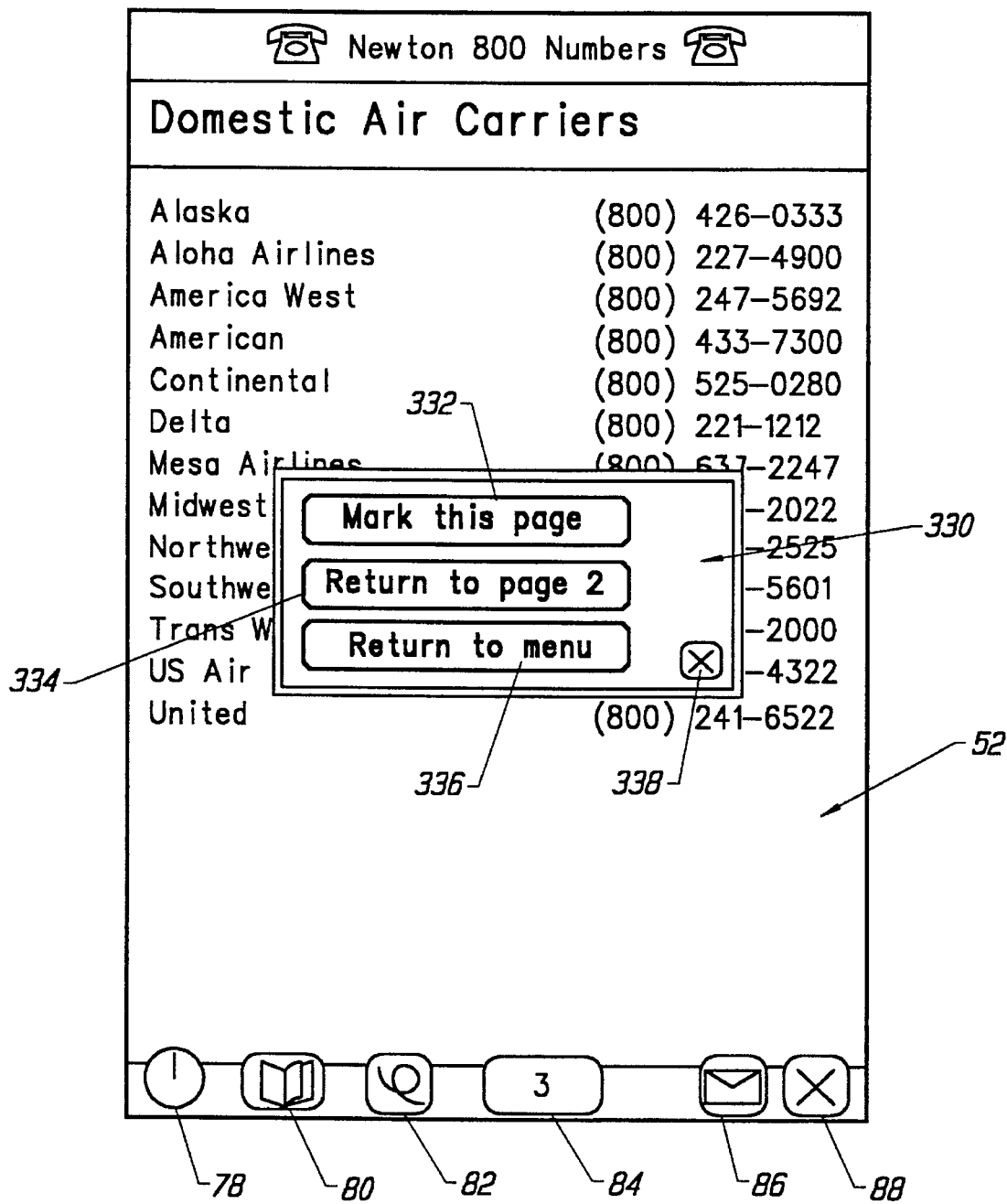
FIG. 6 is an illustration of a screen display showing a navigation dialog box in accordance with this invention.
Figure 7:
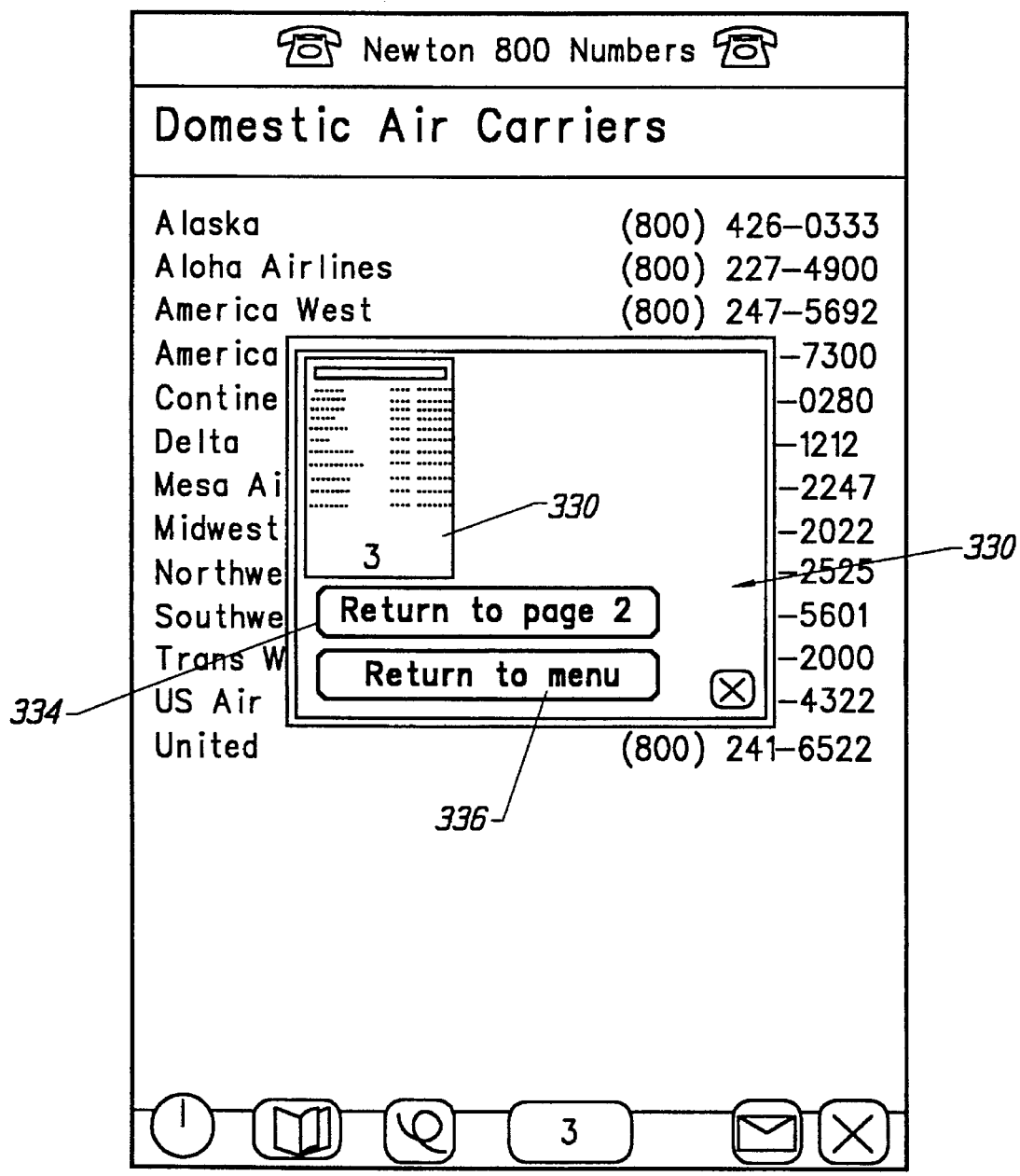
FIG. 7 is an illustration of a screen display showing a navigation dialog box with a bookmark displayed.

Another navigational aid available to the user is the bookmark or "navigation" window 330 shown in FIG. 6. This window can be opened on display screen 52 by tapping bookmark button 80 in the status bar of the content engine. In the embodiment shown, bookmark window 330 includes a mark page button 332, a return to previous page button 334, and a return to menu button 336. In addition, the bookmark window 330 includes a close button 338 which, when selected, will close the window. If mark page button 332 is selected, a "bookmark" is inserted at the current (displayed) page. The bookmark is preferably represented as a icon in the form of a miniature version of the marked page and displayed within bookmark window 330. An exemplary bookmark icon 340 is shown in FIG. 7. When a bookmark is created for a current page, the user can thereafter close the bookmark window 330 and go about performing other actions. When the user wishes to return to the marked page, he or she simply opens the bookmark window from anywhere in the book and then selects bookmark 340 (by, e.g., tapping). The marked page will then immediately become the current page. In preferred embodiments, bookmarks are automatically removed after a predefined number of new bookmarks have been added (e.g. six). In other words, the system only remembers a certain number of bookmarks. In alternative embodiments, individual bookmarks can be removed by the user.

Selecting the return to page button 334 of bookmark window 330 causes the content engine to change the current page to the immediately preceding current page. In other words, the page that had been displayed immediately before the current page is redisplayed when button 334 is selected. The number of that particular previous page will be shown within the return to page button 334. For example, as shown in FIGS. 6 and 7, the immediately previous page was page 2 while the current page is page 3 (as shown in page number button 84).

Figure 8:
FIG. 8 is an illustration of a screen display showing a kiosk or menu page in accordance with this invention.
Figure 8:
Figure 8:
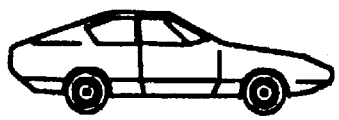
Figure 8:
Figure 8:
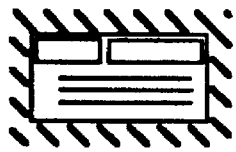
Figure 8:
Figure 8:
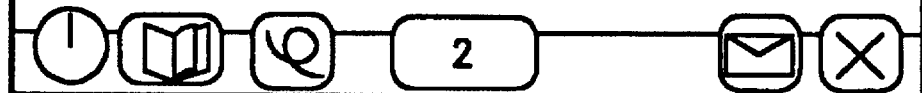

Selecting the return to menu button 336 of bookmark window 330 causes the nearest previous menu page to be displayed. In preferred embodiments, the book will include various menu pages throughout its content. Each of these menu pages lists various other destinations that the user may be interested in within the book. In some embodiments, the actual name of the menu page (e.g., "airlines," "computers," etc.) may appear in the "return to menu" button. Thus, the button might display "return to airlines" or "return to computers" depending upon where in the book the user is currently located. An exemplary menu page is illustrated in FIG. 8. As shown, the menus page includes various entries identified by both name and icon. The actual format of the menu page is up to the individual author. For example, it may contain buttons rather than names or it may contain no graphics at all. In the embodiment shown, by selecting one of the listed items (e.g., "Auto Rental Agencies"), the system moves to the first page listing the auto rental agencies contained in the book.

If the user desires to include handwritten notes in the margins or other locations of a page, he or she first selects the "mark-up" button 82 to allow handwritten notes to be accepted on the current page. The user is then free to write anywhere on the screen without affecting the contents of the displayed page. The user's markings are simply stored as ink objects on an "overlay" of the current page. The markings can be hidden by tapping "mark-up" button 82 and then redisplayed by tapping "mark-up" button 82 a second time. In the example shown in FIG. 9, the user's markings designate times and flight numbers associated with various airlines (reference numbers 368 and 366).

Figure 10:
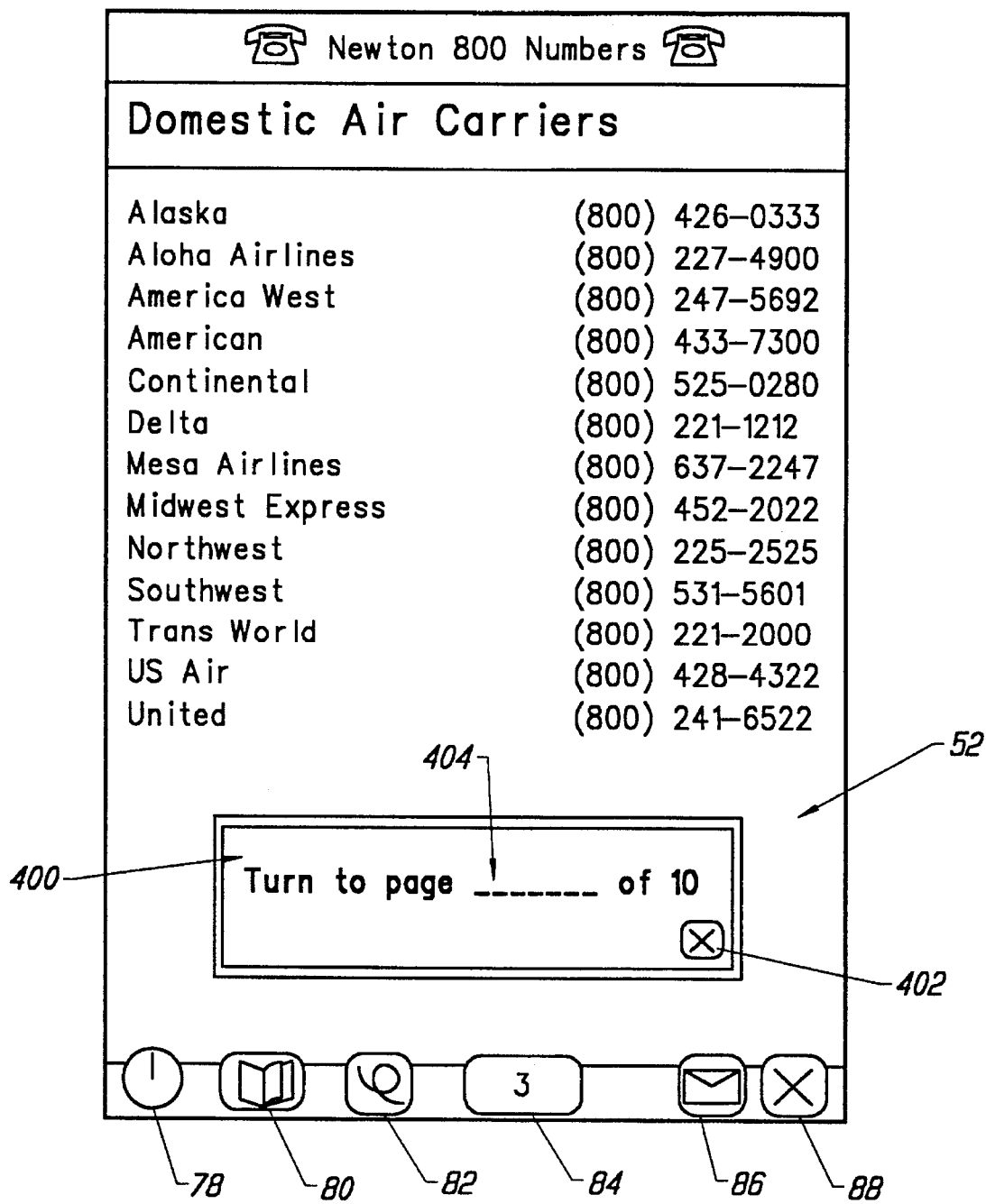
FIG. 10 is an illustration of a screen display showing a page number selection dialog box according to this invention.

In another feature, the user can turn to a specific page by first tapping on page number button 84 to display a page number dialog box 400 as shown in FIG. 10. Within the page number dialog box is a field 404 for inserting the desired page number. Typically, the user simply enters the page number he or she wishes to turn to by writing that number in field 404. The system then recognizes the number and automatically changes the current page to the page having the recognized page number. The new current page is then displayed on screen 52 and page number window 400 disappears. The user can also close the page number dialog box by selecting the close button 402 in the lower fight corner of the page number window.

III. PREPARING INTERACTIVE REFERENCES

Figure 11:
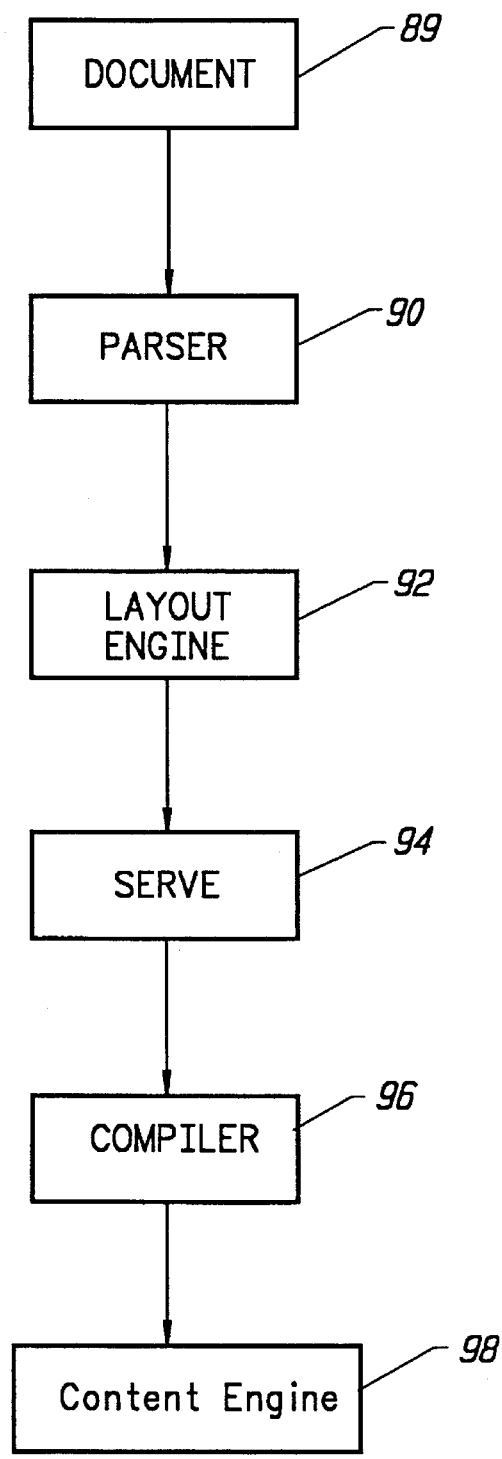

FIG. 11 is a block diagram showing the modules used to prepare interactive references in the system of the present invention. A document 89 containing various commands for structuring the book is received by a Parser 90 which converts the document to a series of records in accordance with the commands. These records contain various pieces of information associated with the book such as its title, various commands for live screen action, the text and pictorial content of the book, etc. The individual records (especially the content records) are then arranged on pages by a layout engine 92. More particularly, the lay-out creates "page descriptions" specifying coordinates, lay-out style, etc. for the records that comprise each page. The records and page descriptions prepared by the Parser and Lay-out engine are then converted by a Serve module 94 to scripts in a language that can be understood by the content engine. The resulting scripts are compiled as machine language by a compiler 96 before they are used by content engine 98. As noted, the content engine is a system used to display views of interactive references prepared according to this invention. The content engine generally resides within and runs on a pointer base computer such as pen-based computer 10. In a preferred embodiment, the compiled scripts produced by compiler 96 are stored on a PCMCIA card which can be inserted in pen-based computer 10.

The documents input to the Parser are preferably conventional word processing/graphics documents that have been modified to include specific commands necessary to define the functions of an interactive reference. Thus, an author can convert a literary work, a reference work, etc. to a book for use with this invention by simply inserting appropriate commands within the body an electronic version of the work. The commands will preferably be easy to distinguish from the body of the work. They may, for example, be recognizable by starting with periods (".") on a new line. Some commands will specify the beginning of a new content record such as a paragraph or picture, a live action command, a subject for a table of contents, etc. Other commands will specify an attribute of the interactive reference or of a content record. The various types of command will be discussed below.

Figure 12:
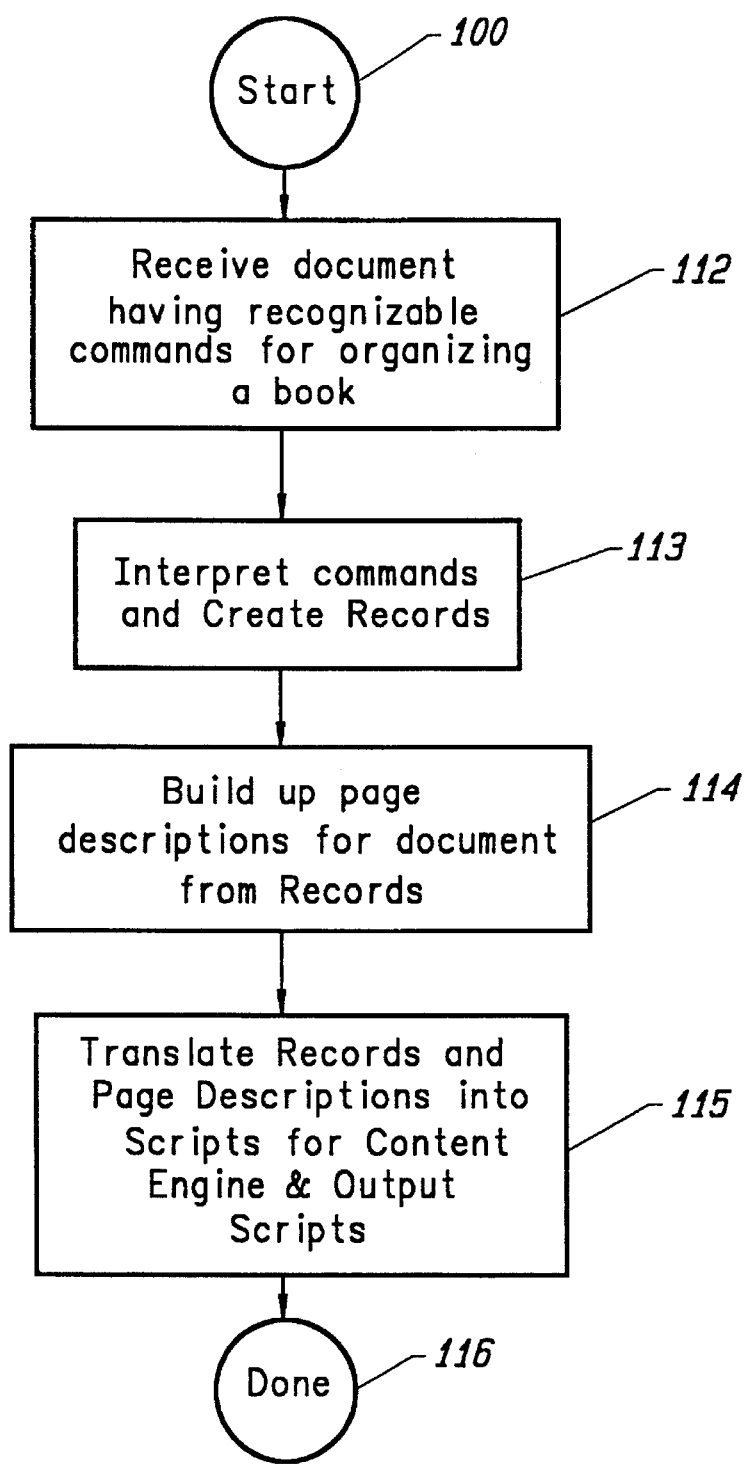
FIG. 12 is a process flow diagram of the principal steps employed in the present invention.

An overview of the process steps used to prepare interactive references or books according to this invention is provided in FIG. 12. The process begins at 100 and proceeds to a step 112 in which a document having recognizable commands as described above is input into the system (e.g. a process running on a Macintosh computer). Thereafter, a step 113 interprets the commands within the document and creates records based upon (1) the instructions in those commands, and (2) the other contents of the document. This step is typically performed by the Parser module as described above. The resulting records—which are stored as an array in memory—are then used to build up, in a step 114, page descriptions containing the contents, coordinates, and lay-outs for each page of the electronic book. This is accomplished by the Lay-out engine module described above. Finally, a step 115 converts the page descriptions produced in step 114 and the records produced in step 113 to a file of scripts. The scripts are provided in a language that can ultimately be understood by the machine that will run the interactive reference (i.e., the system containing the content engine). This step also (1) encodes searching aids known as "hint bits" for some of the records as described below, and (2) links sources and destinations for live screen actions. Step 115 is typically implemented by the Serve module as described above. The resulting script can then be compiled and used by a content engine in a pointer-based computer. The process is completed at 116.

Figure 13:
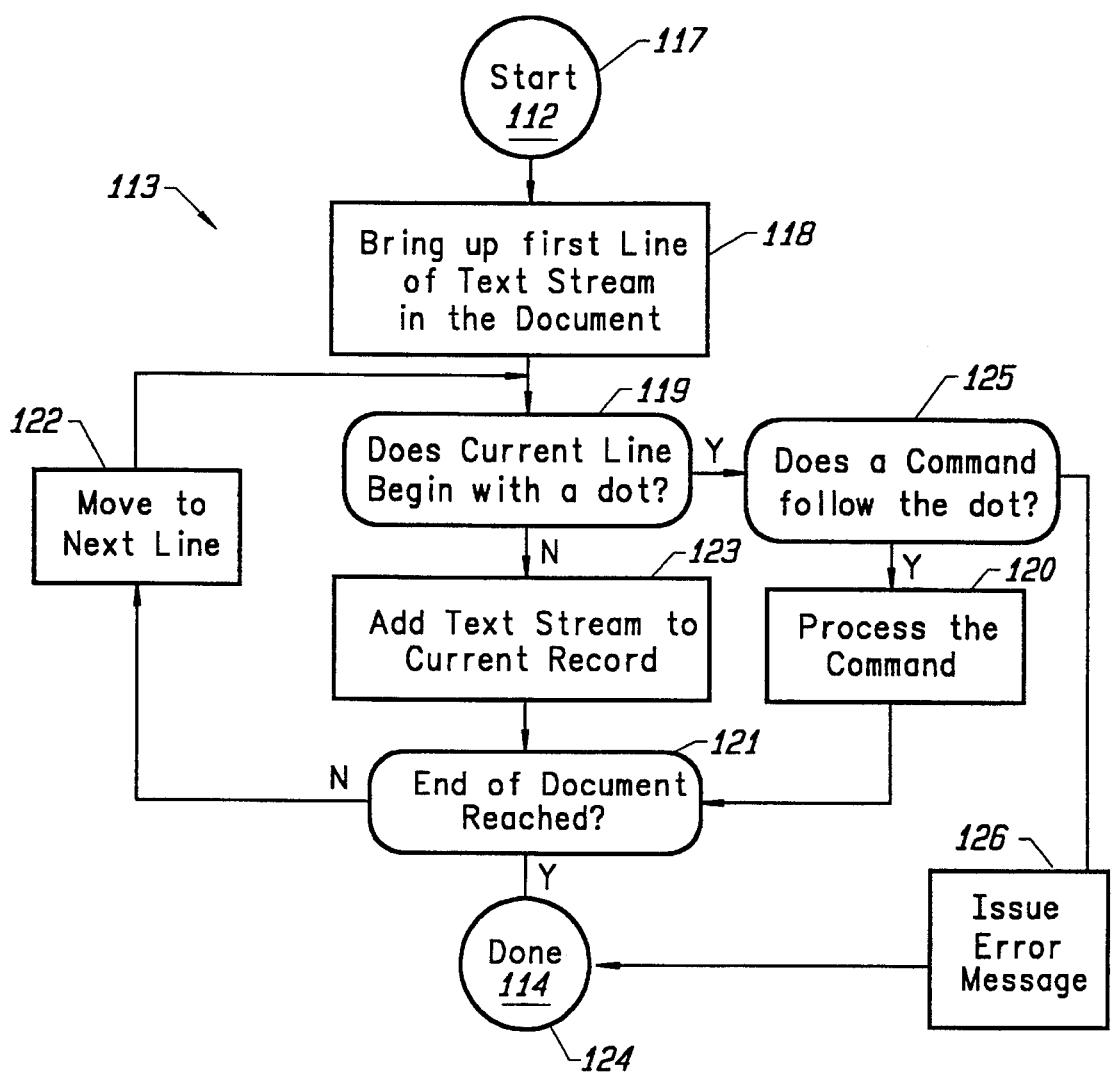
FIG. 13 is a process flow diagram showing the steps employed by the Parser in processing a document.

The process of creating records (step 113 of FIG. 12) is detailed in FIG. 13. As depicted in FIG. 13, the Parser marches through the document, processing content and commands as it proceeds until reaching an "end of document" command or indicator. The process begins at 117 (after step 112 of FIG. 12) and proceeds to a step 118 which brings up the document's first line for consideration. Thereafter, a decision step 119 determines whether the current line (line I in this case) begins with a dot. This indicates that the a command should follow, but, of course, other indicators could also be used. Dots are convenient because lines of text content should not begin with a dot. If decision step 119 finds that the line under consideration does indeed begin with a dot, a decision step 125 determines whether a command follows the dot. If not, an error has occurred resulting in a step 126 issuing an error message and then terminating the process at 124. If on the other hand, decision step 125 determines that a command does indeed follow the dot, the command is processed in a step 120. The details of this process will be provided below in connection with FIGS. 14 and 15. As noted, a command typically creates a new record or defines a feature of a current record (i.e. one that has been opened by a previous command). After the command has been appropriately processed, a decision step 121 determines whether the end of the document has been reached. If not, the process continues at a step 122 which moves the Parser to the next line of the document. The next line is then evaluated in decision step 119 to determine whether it begins with a dot. The process continues in this manner until each line of the input document has been evaluated and processed. When decision step 121 finds that the end of the document has been reached, the process is completed at 124 (corresponding to step 114 of FIG. 12). At that point, the Parser module has completed its job of converting the document to a collection of records that can be used to further prepare the interactive reference for use in a content engine. When the Parser encounters a line that does not include a command (i.e., the question posed in decision step 119 is answered in the negative), a process step 123 adds the content of that line to the current record. The commands will have specified how such content is to be used in the current record.

Most commands can be categorized as one of five main types: (1) document commands, (2) content commands, (3) lay-out commands, (4) browser commands, and (5) kiosk commands. Document commands specify such document specific information as the title, author, publication date, ISBN, etc. Most published books in circulation throughout the world have an ISBN for identification. Usually, it takes the form of a series of numbers separated by dashes. Because an electronic book prepared according to this invention is in many regards like a conventional paper and ink book, authors of electronic books are encouraged to follow many of the protocols established for conventional books. One of these is obtaining an ISBN. Content commands specify the beginning of certain types of content within the document. For example, the content can be text, pictures, kiosk pages, scripts for live action, etc. In addition, some content commands specify subjects for the listing in the table of contents or browser described above. Lay-out commands define a particular type of page lay-out to be employed in the interactive book. Types of lay-out include plain, sidebar, two-column, etc. Browser commands specify the title appearing in the browser window. Other commands allow comment lines, create indexes, define flags, create preambles and postambles, etc. Kiosk commands specify the beginning of "kiosk mode" (with ".kiosk") and the end of kiosk mode (with ".endkiosk"). As noted kiosk or menu pages appear at various locations throughout the document to provide a navigational aid. When a .kiosk command is encountered, the subsequent content "belongs" to the current kiosk until a .endkiosk command is encountered. Various types of information can belong to a kiosk including text, graphics, and interactive features such as menus and buttons.

Figure 14:
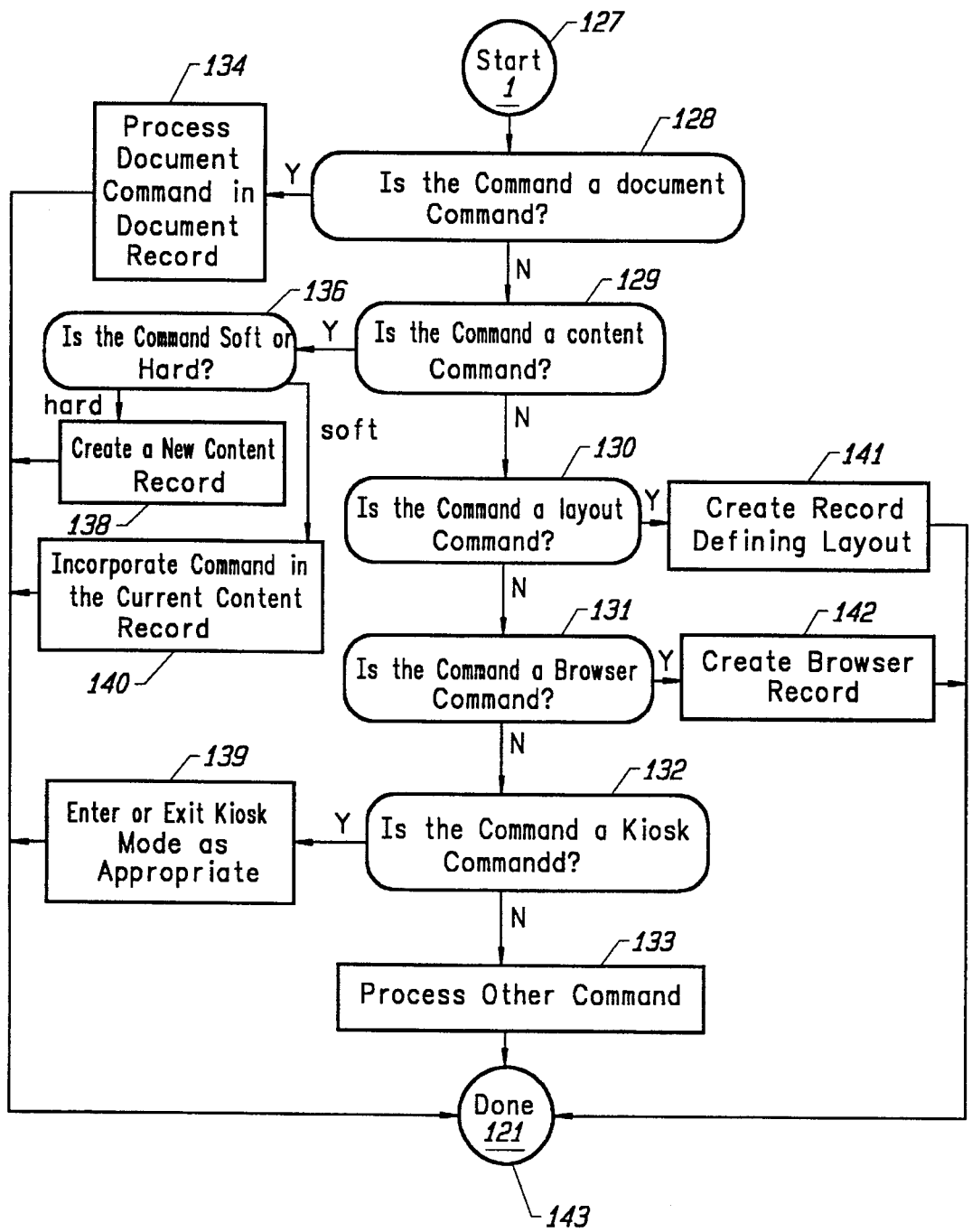
FIG. 14 is a process flow chart showing how the Parser treats commands within the document.

FIG. 14 details the steps associated with processing a command (step 120 of FIG. 13). The process begins at 127 and moves to a decision step 128 which determines whether the command under consideration is a document command. If not, the process moves to a decision step 129 which determines whether the command is a content command. Then, assuming the answer is negative, the process moves onto decision steps 130, 131, and 132 to determine whether the command is a lay-out command, a browser command, or a kiosk command, respectively. If the command is not a document, content, lay-out, browser, or kiosk command (i.e., the answers to decision steps 128, 129, 130, 131, and 132 are all negative), it must be another type of command. In this case, the system moves to step 133 where the other command is processed. At that point the command has been appropriated treated and the process is completed at 143.

If decision step 128 determines that the command is a document command (because it specifies a title, copyright, ISBN or some other document feature), a step 134 processes the command in a document record. One document record is created for each interactive book and acts as a repository for the information in the document commands (e.g., the title, author, publication date, ISBN, expiration date, marketing blurb, publisher, key words, etc.). After step 134, the process is completed at 143. If decision step 128 determines that the command under consideration is not a document command, but decision step 129 determines that it is a content command, the process moves to a decision step 136 which determines whether the content command is "hard" or "soft." Hard content commands indicate the beginning of a new content record, while soft content commands indicate a feature of an existing content record. Generally the content record to which the soft command pertains is the record that is currently being created. If decision step 136 determines that the content command is hard, a process step 138 creates a new content record and content in subsequent lines is added to it. The hard content command will generally specify the type of content record to be created (e.g., picture, text, form, etc.). The details associated with creating a new content record will be set forth below with reference to FIG. 15. If decision step 136 determines that the content command is a soft content command, a step 140 incorporates that command in the current content record. In operation, a soft content command appears after a hard content command for the current record, but before a command indicating that the current record is to end. Exemplary soft commands include script commands describing some action to be taken in the current content. For example if the current content is a picture, the script soft command might specify that when the picture is tapped, a menu appears. After either of steps 138 or 140, the process is completed at 143.

If the current command is neither a document command nor a content command, decision step 130 determines whether it is a lay-out command. If so, a step 141 creates a record defining a lay-out as specified in the command. This simply involves giving a name to a particular type of lay-out. After step 141, the process is completed at 143. If decision step 130 is answered in the negative, decision step 13 1 determines whether the command is a browser command. If so, a step 142 creates a browser record and sets the title of the browser as specified in the command. The process is thereafter completed at 143. Finally, if the command is not a browser command, but decision step 132 determines that it is a kiosk command, a process step 139 causes the system to enter or exit kiosk mode appropriate. If the command is ".kiosk" the system enters kiosk mode and if the command is ".endkiosk," the system exits kiosk mode. As noted, the kiosk mode simply indicates which, if any, kiosk page the content is associated with. This allows the bookmark navigation dialog box to identify the appropriate kiosk page when the "return to menu" button is selected.

As noted, step 133 processes any other commands not specifically identified above. One such command specifies that subsequent material includes an "intelligent assistance" template for the book. An exemplary intelligent assistance template may respond to the text stream "reserve room" written in an appropriate dialog box by opening the book of toll-free phone numbers to the page listing hotels, motels, and inns. Intelligent assistance routines are described in more detail in U.S. patent application Ser. No. 07/889,225, filed on May 27, 1992, naming Luciw as inventor, and entitled "Deducing User Intent . . . ," which is incorporated herein by reference for all purposes.

Figure 15:
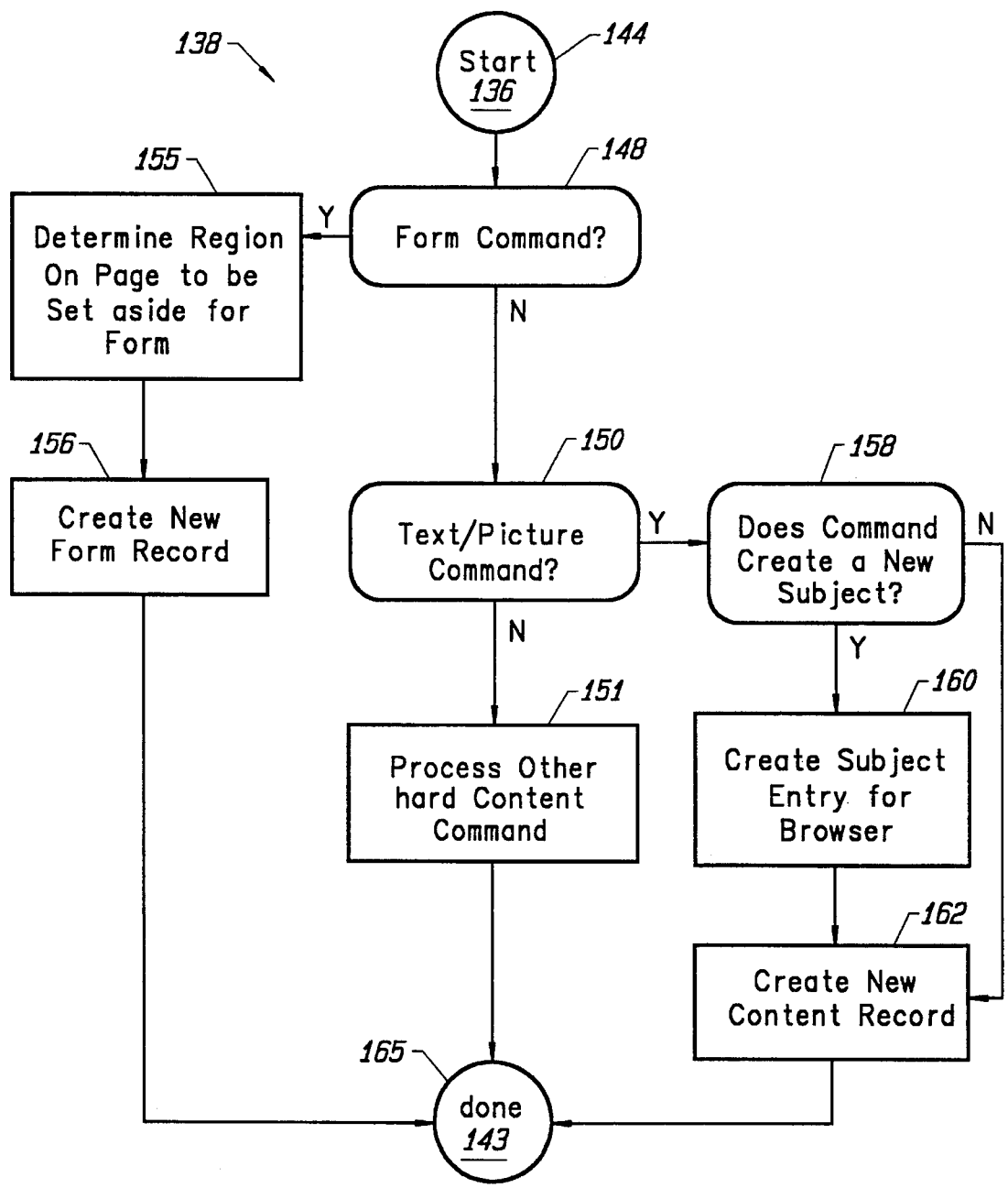
FIG. 15 is a process flow diagram detailing the steps employed in treating content commands in accordance with this invention.

FIG. 15 details the procedure for creating a new content record (i.e., step 138 of FIG. 14). Content refers to generic information that appears on the screen 52 of an electronic book. As noted, it can take various forms such as graphics, text, template (form), etc. This process of FIG. 15 includes two major steps: (1) determining what type of content record is to be created, and (2) determining how that record is to be processed. The process begins at 144 (between steps 136 and 138) and proceeds to a decision step 148 which determines whether the command is a form command. As noted, a form describes a live action and the display features associated with that action. If the command is not a form command, a decision step 150 determines whether it is a text or picture command. If it is none of these commands, a step 151 processes what ever type of hard command that it is. The process is then completed at 165 (143 of FIG. 14).

If decision step 148 determines that the command under consideration is a "form" or template command a step 155 determines what region of a page is to be set aside for the form. This may be region occupied by a dialog box, button, slide bar, etc. associated with the form. Thereafter, a step 156 creates a form record which will include text and scripts following the command until an "END SCRIPT" command is encountered. The script specifies the action associated with the form that is to be taken. After step 156, the process is completed at 165 as described above. Preferably, the system of this invention will make certain types of form available to the user. These include, for example, forms for preparing a browser, a navigation dialog box (with associated buttons such as bookmark and return to menu buttons), a page number dialog box, etc.

If both decision step 148 is answered in the negative, decision step 150 determines whether the command under consideration is a text or picture command. If it is, a decision step 158 determines whether the command creates a new subject as indicated by, for example, the command ".subject." If so, a process step 160 creates a subject entry for the browser. As explained, the browser lists various subjects or contents that the document author has designated. After step 160 adds the subject to the browser, a step 162 creates a new content record for the text or picture and the process is completed at 165. Subsequent text or picture content is thereafter added to the new record until the next hard command is encountered. If decision step 158 determines that the command under consideration does not create a new subject, process control moves directly to step 162 where a new content is created without adding a subject to the browser.

To this point, the records produced contain various pieces of information about the document, its content, and navigational tools. However, they contain no information specifying how the records are to be displayed on the individual pages of the document (e.g., what page coordinates should be reserved for the document). This can, of course, vary depending upon the dimensions of the display. Thus in preferred embodiments, the output of the Parser module (an array of records) will be independent of the display dimensions in the electronic reference. This way the records created by the Parser can be used with displays of different types and sizes. When the display has been identified, the Lay-out engine can convert the records to appropriate page descriptions specifying the page number and coordinates of each content record. This process is detailed in FIGS. 16*a* and *b* and 17*a–c*.

Figure 16A:
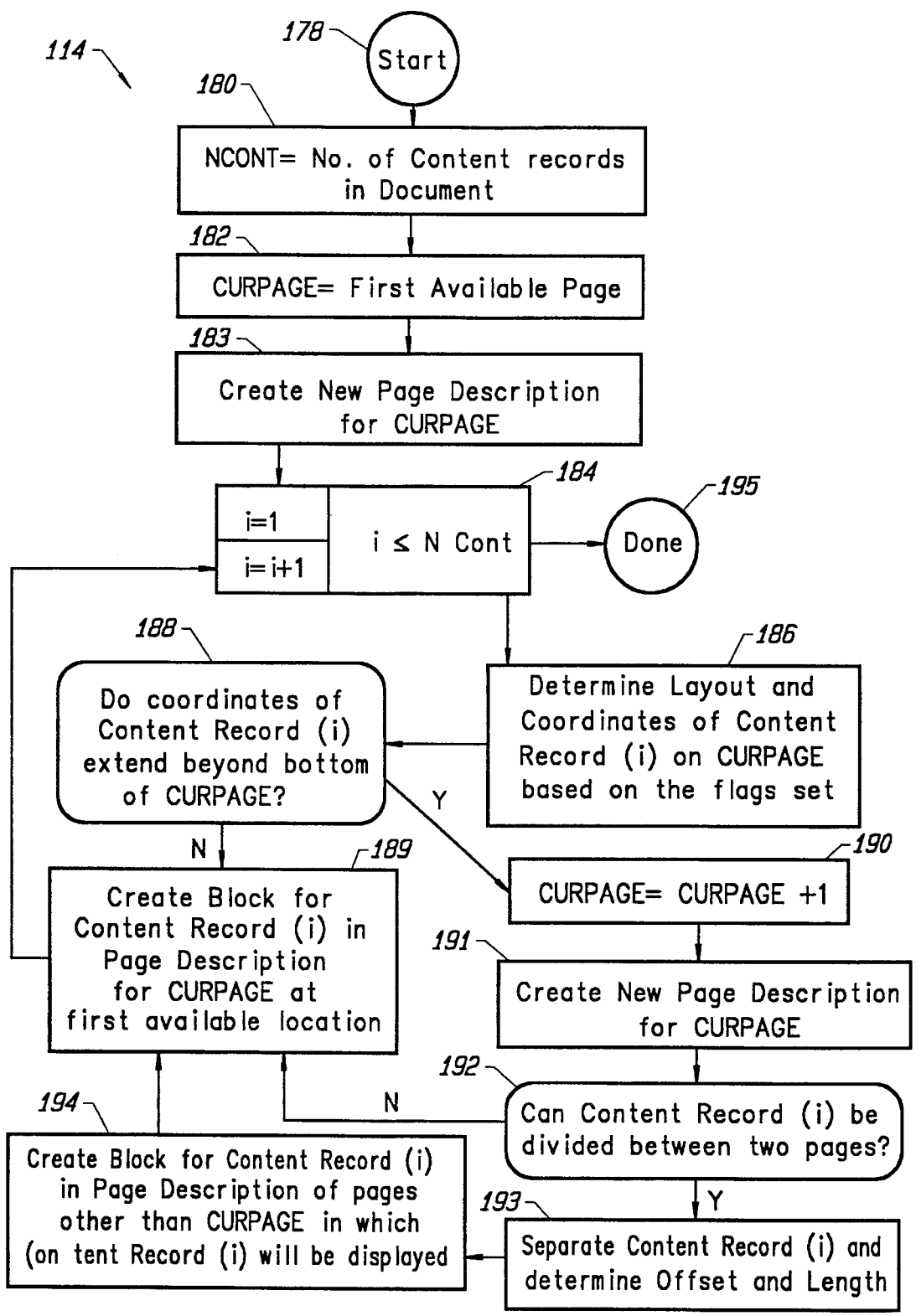
FIG. 16a is a process flow diagram detailing the steps employed by the Lay-out engine in preparing page descriptions.

FIG. 16*a* details the process by which records are converted to page descriptions for an interactive reference. This corresponds to step 114 of FIG. 12. The process begins at 178 and proceeds to a step 180 which sets the variable NCONT equal to the number of content records in the document. This allows the system to loop through the records comprising the document and recognize when the last record has been encountered. As with the other processes discussed herein, a looping process is not mandated by the invention but is simply presented here for ease of understanding. Typically, the pages for which descriptions are being created are treated in series, with the page being described referred to as the "current page."

After step 180 sets NCONT, a step 182 sets the variable CURPAGE equal to the first available page in the document (i.e., the first page on which content can be provided) and a step 184 begins the process of creating a new page description for CURPAGE. This simply means that the current page is available to have content, coordinates, live actions, etc. specified. Thereafter, an iterative loop step 184 initializes a content record counter "i" to one and determines whether i is less than or equal to NCONT. If so, the process proceeds to a step 186 which sets the lay-out and coordinates for content record(i) on CURPAGE such that the record is added at the first available space. It should be noted that the lay-out of the record (e.g., side-bar, normal, etc.) is specified by the lay-out flags specified within the record. Of course, it is possible that content record (i) might extend beyond the boundaries (usually the bottom boundary) of CURPAGE. Thus, after step 186, a decision step 188 determines whether the coordinates assigned to record(i) on CURPAGE extend beyond the boundaries of CURPAGE. If not, a step 189 creates a block for content record (i) in the page description for CURPAGE as specified in step 186. Blocks, which will be discussed in connection with FIG. 17, describe the coordinates, lay-out, etc. of a content record in a page description. After step 189 has been completed, process control returns to interactive loop step 184 where record counter i is incremented by one and the system again checks to determine whether i is less than or equal to NCONT. If so, the process again proceeds to steps 186 and 188 as described.

If step 188 determines that the coordinates of content record(i) extend beyond the boundaries of CURPAGE, the process moves to a step 190 which increments CURPAGE by one and then to a step 191 which creates a page description for CURPAGE. Next, a decision step 192 determines whether content record (i) can be divided between two pages. Obviously, most pictures cannot be divided, but most text can be. If record(i) can, in fact, be divided between two different pages, a process step 193 separates that record at the page break and sets an "offset" and a "length" associated with the separation. The offset refers to the distance from the start of the content to the page break, and the length refers to the number characters from the content that appear on the previous page. Next, a step 194 creates a block(s) for content record(i) on those pages other than CURPAGE which will contain parts of record(i). From there, the process proceeds to step 189 which creates a block for record(i) on CURPAGE as described above. Process control then returns to iterative loop step 184 and proceeds as described above. If decision step 192 determines that content record (i) cannot be divided between two pages, the process simply moves to step 189 and proceeds as described above. When all the content records produced by the Parser have been incorporated in a page description according to this process and i is greater than NCONT, the process is completed at 195.

Figure 16B:
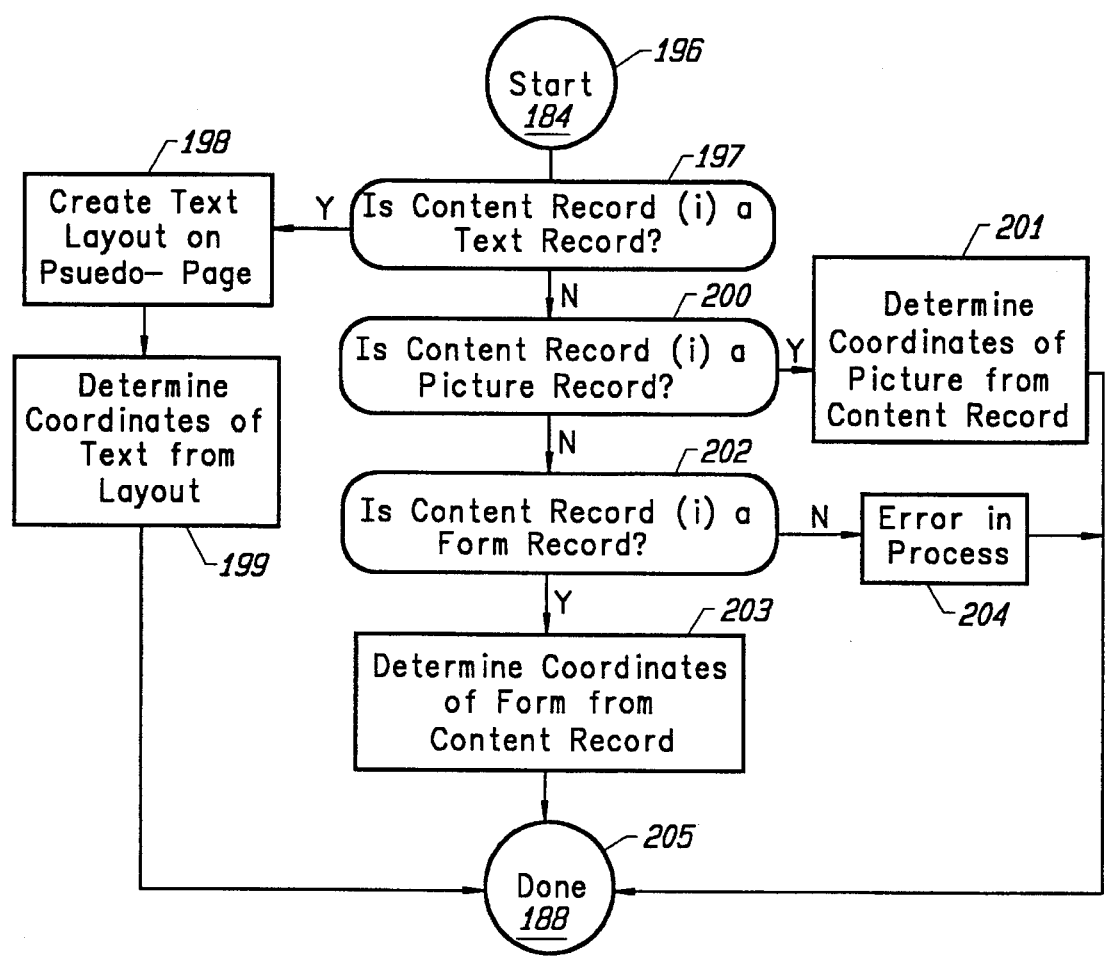
FIG. 16b is a process flow diagram detailing the steps employed in determining the layout and page coordinates of a content record.

FIG. 16b details the steps associated with determining the coordinates of a content record (step 186 of FIG. 16a). The process begins at 196 and proceeds to a decision step 197 which determines whether the content record is a text record.

Text records are really the only type of record that is particularly interesting for this procedure. Assuming that the current record is a text record, a step 198 creates a layout of the text contained therein on a pseudo-page to determine its dimensions and layout. The text in the content record is added to the pseudo-page according to the font type, font size, spacing, lay-out instructions, etc. When text has been completely laid out in this manner, a step 199 determines the coordinates of the text boundary. The process is then completed at 205 and decision step 188 (FIG. 16a) can determine whether the content extends beyond the bottom of a current page. If the current content record is not a text record, a decision step 200 determines whether it is a picture record. If so, a step 201 determines the coordinates of the picture from the content record. Picture and form records contain bounding coordinates internally, so there is no need to first lay-out the content on a pseudo-page. From step 201, the process is completed at 205 as described above. If decision step 200 determines that the current record is not a picture record, a decision step 202 determines whether it is a form record. If it is not, an error has occurred (step 204) because, in this embodiment of the invention, the content record must be either a text, picture, or form record. This does not preclude the use of other types of content records such as tables, and animations in other embodiments. Assuming that decision step 202 determines that the current record is a form record, a process step 203 determines the coordinates associated with that form (i.e., its dialog box, menu, button, etc.) in the same manner as step 201 determined the coordinates of a picture content record. The process is then completed at 205.

Figures 17A, 17B, 17C:
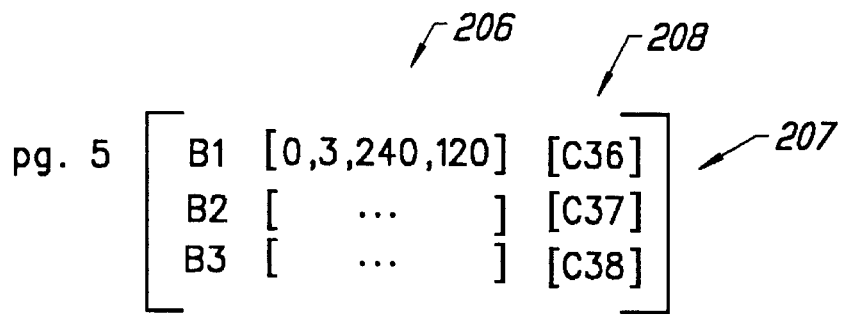
FIG. 17a–c are illustrations of a page description and content records prepared by a computer system of this invention to create a page display.

FIG. 17a shows how the blocks might be arranged for a page description prepared as described above. In the example shown, the current page is page 5 which includes three blocks identified as B1, B2, and B3 at the left side of array 207. Each row of array 207 corresponds to a different block. The blocks include coordinates 206 which specify the location on screen 52 where the block will be displayed. In addition, they include a content identifier 208 which refers to a frame (stored elsewhere) containing the content that will ultimately be on the page at the coordinates specified by the array. In the example shown, content record C36 is associated with block 1, content record C37 is associated with block 2, and content record C38 is associated with block 3. As noted, the content may take various forms including text, graphics, and templates for interactive displays. In some cases, one or more scripts specifying actions to be taken in connection with the page will be included within page description 207. These actions can include, for example, displaying a dialog box if a certain content within the page is selected.

FIG. 17b shows a hypothetical text content frame. First, it includes a slot 209 for the actual text that appears in the content. Next, it includes a "styles" slot 210 which specifies the style associated with each character. Typically, each style will be given a code which is specified in the styles slot beside a character number for the first character to which the style is applied. The character number is typically an offset from the beginning of the text stream. Thus, if the fifth character of the stream begins a text segment to be displayed in bold-face, the style slot may have code for bold-face adjacent the number five (referring to the fifth character of the stream). The text content also includes a layout slot 212 which may specify such features as whether the text is centered, has borders, forms a sidebar, etc. Further, the text content may also include a scripts slot 211 containing scripts for certain actions to be taken in connection with the text content. Still further, various attributes may be associated with any content such as one or more colors, a phone number, a food type, a city, etc.

FIG. 17c illustrates a graphics content. The first slot 214 indicates that the content is an icon and provides instructions for drawing the icon. The instructions may be in, for example, a bit map, quick draw instructions, postscript instructions, etc. Next, a layout slot 216 specifies that the graphics will be displayed in side-by-side mode. In addition, a script slot 217 includes scripts for taking action in connection with the graphic. The action can include, for example, displaying a particular page or dialog when a user taps on the graphic. Finally, "Food" and "City" attributes associated with the content are provided in the bottom two slots.

Figure 18:
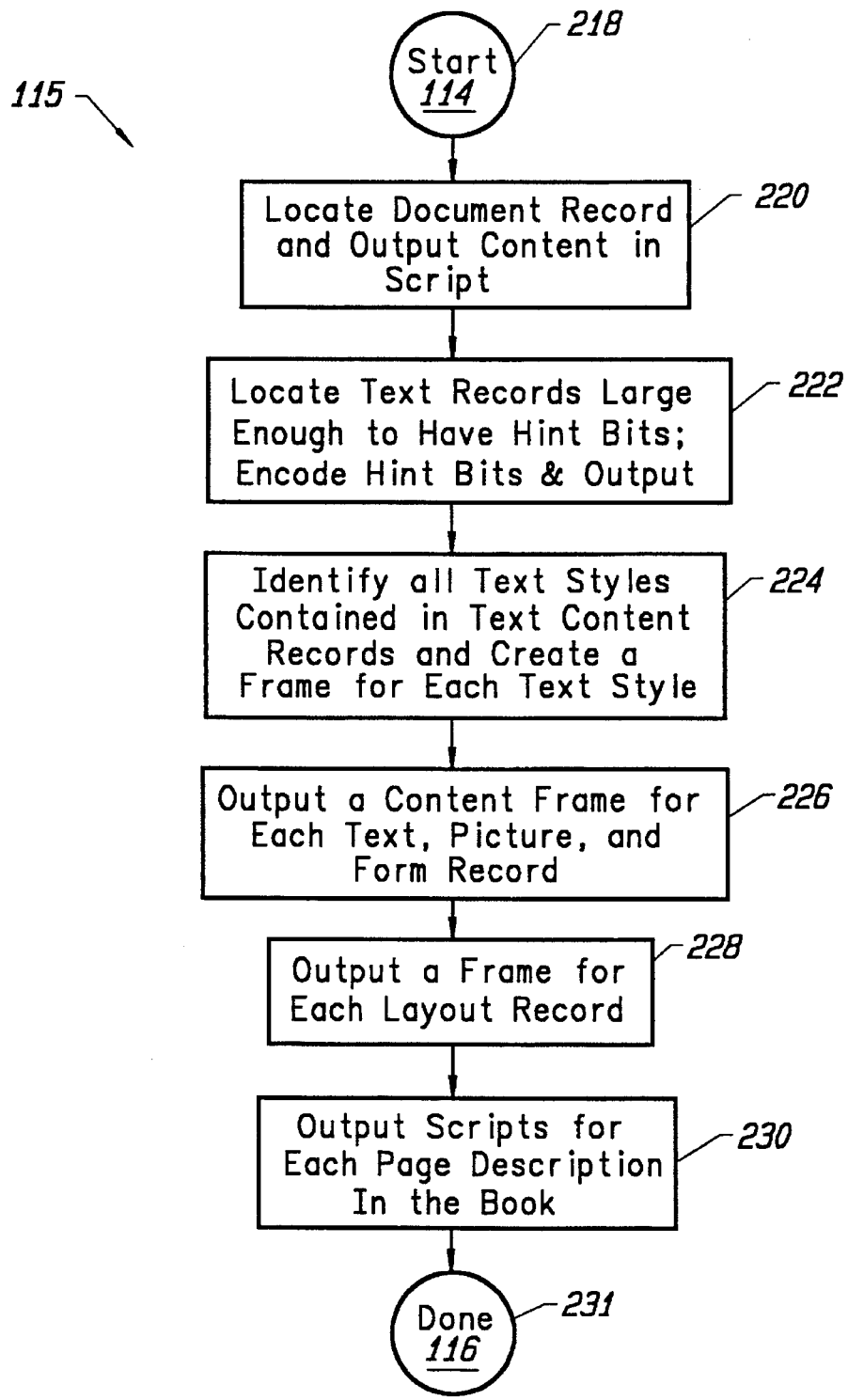
FIG. 18 is a process flow diagram detailing the steps employed by a Serve module of this invention to prepare instructions for an interactive book.

FIG. 18 details the process by which the records and page descriptions prepared as described above are converted to a format that can be utilized by the content engine. This process is also represented by step 115 of FIG. 12. Briefly, the process involves translating the records and page descriptions into scripts that can be understood by the content engine, and then outputting that script in a file to compiled. The process begins at 218 and proceeds to a step 220 which locates a document record for the interactive reference, converts that record to the appropriate script, and outputs the script to an output file. The document record as well as other records converted in this process are preferably stored as an array in memory. Many of the steps described in connection with FIG. 18 involve scanning these records to locate records.

After step 220, the process moves to a step 222 which locates those text content records large enough to contain "hint bits" used as an aid in conducting character string searches. Those records that are sufficiently large are thereafter evaluated to encode hint bits. The details of this process and its significance will be discussed below. After step 222 has been performed, a step 224 searches the array of records to identify all the different styles used in text content records. Accessible frames are then created for each style so identified. By saving the text style descriptions in such universally accessible frames, the system need not respecify the description for each occurrence of a particular text style. Each text content simply references the pertinent style frames for each style it requires. After step 224 has been performed, a step 226 outputs a script content frame for each content record (text, picture, and form) contained in the array of records. These frames contain the same information contained in the content records, including, for example, the information shown in FIGS. 17b and 17c. As with all outputs in this process, the content frames are provided in a script understandable by the content engine. Next, a step 228 outputs a frame for each lay-out type (side-by-side, normal, etc.) defined above at steps 128 and 141 (FIG. 14). Finally, a step 230 outputs scripts for each page description prepared the lay-out engine. These are simply script versions of page descriptions such as the one depicted in FIG. 17a. The process is completed at 231. By now a file that has been created that can be compiled to machine readable code and used by the content engine to run an interactive reference.

As noted, step 222 identifies those records containing information that can be used to create hint bits. Hint bits are arrays of "trigrams" for the textual content of a record. Each trigram is a number representing a sequence of three consecutive letters in a text string. The trigrams for a search string can be compared against other trigrams (i.e., the hint bits) created for certain text contents in the book. By first determining whether the trigrams in the search string are matched by trigrams in the content, the system can determine whether it is worth doing a full text search of the content. In this way, a significant number of the potentially searchable text contents can be eliminated from consideration, significantly improving the efficiency of the search.

Because hint bits are used as a search tool for text strings, certain content records such as graphics records are ignored. Hint bits will be created for text records larger than a defined minimum size. In a preferred embodiment, records smaller than about 128 bytes will not contain hint bits. Of course, this cut-off value can be increased or decreased in other embodiments. Generally, the cut-off size can range in length between about 128 and 512 bytes.

Figure 19:
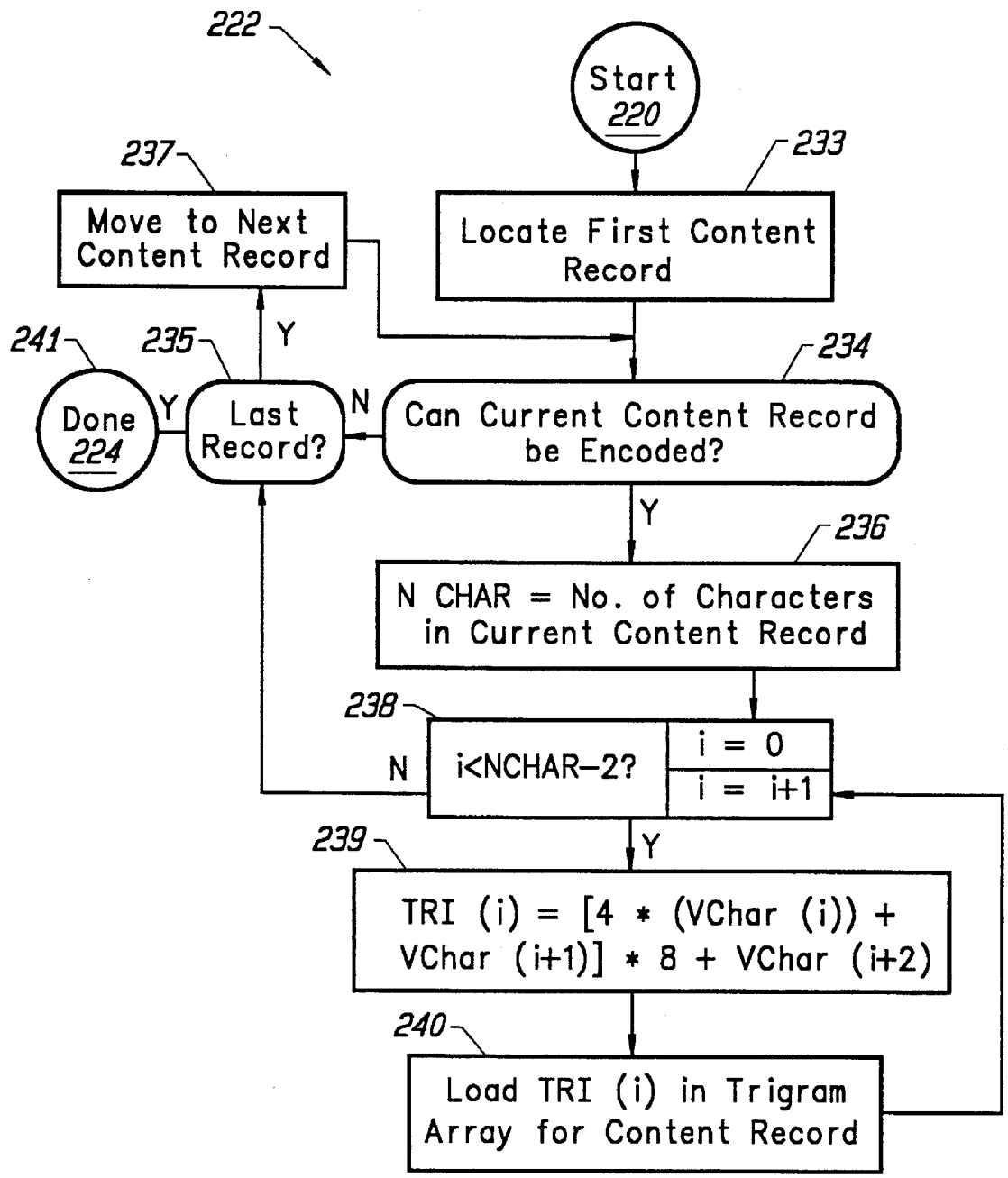
FIG. 19 is a process flow diagram detailing the steps of encoding a character string as a "trigram" array.

FIG. 19 details the procedure by which a text content record (or other text string) is located and encoded as a trigram. This corresponds to step 222 of FIG. 18. Briefly, each text character has an associated numerical value available in a table. For instance, the various ASCII characters will each have an associated, unique numerical value. A trigram is encoded by combining the numerical values for each of three successive characters. The resulting value is not unique for the three successive characters, but it is different from the trigram value for the vast majority of other three letter sequences. Because it is much easier to compare numerical values associated with trigrams than to do a full text search, the search procedure of this invention first compares the search string trigrams against those of the content before doing the full text search.

The process is started at 232 and proceeds to a step 233 which identifies the first content record in memory. Thereafter, a decision step 234 determines whether the current content record can be encoded as hint bits. If so, a step 236 sets the variable NCHAR equal to the number of characters in the content record. Next, an iterative loop step 238 initializes a character counter "i" to zero and compares the current value of i to the value NCHAR minus 2. If i is less than NCHAR minus 2, the process moves to a step 239 which sets the first trigram (TRI(i)) equal to a numerical combination of the numerical character values of each of the three successive characters as shown (i.e., 8*(4*VChar(i)+VChar(i+1))+VChar(i+2)). In binary, this expression can be described as follows: the binary notation of VChar(i) is left shifted by 2 and then summed with the binary notation of VChar(i+1); the resulting sum is left shifted by 3 and then summed with the binary, notation of VChar(i+2). The resulting combination of the three values is provided as a binary eight bit trigram which may have a value of between 0 and 255 (in base ten).

Of course other methods of combination are possible, but preferably the chosen method should give an eight bit trigram. Within this constraint, a number of alternative methods are possible. For example, in some embodiments, the search string is encoded as an NGRAM representing a combination of two, four, five, or some other number of character values besides three. In general, NGRAMs comprised of a combination of N characters can be used. However, as the number of characters in an NGRAM increases, the chances that more combinations of characters will give the same value of the NGRAM increases, thus decreasing the reliability of the NGRAM array in predicting whether there will be a hit in a given text content record.

After the numerical values for the individual characters are combined in step 239, a process step 240 loads the value of the trigram in a trigram array (hint bits) being formed for the content record under consideration. The process then returns to iterative loop step 238 where character counter i is incremented by one and compared with the value NCHAR minus 2. Process steps 239 and 240 are repeated for each new character in the search string until the character two characters from the end of the content record is encountered. At that point, each three-character sequence in the search string has been uniquely encoded in a trigram, and iterative loop step 238 directs the process to decision step 235 which determines whether the last record in memory has been considered. If not, the process moves to step 237 which identifies the next content record for consideration. Thereafter, process control returns to decision step 234 which determines whether the current content record can be encoded. If so the encoding process described above is repeated for the new current record. If the content record can not be encoded (e.g., it is a picture record), the process moves to decision step 235 which determines whether the last record has been considered. Assuming it has not, process control once again returns to step 234. Eventually, the last record in memory is considered—at which time decision step 235 will be answered in the negative—and the process is completed at 241.

Figure 20A:
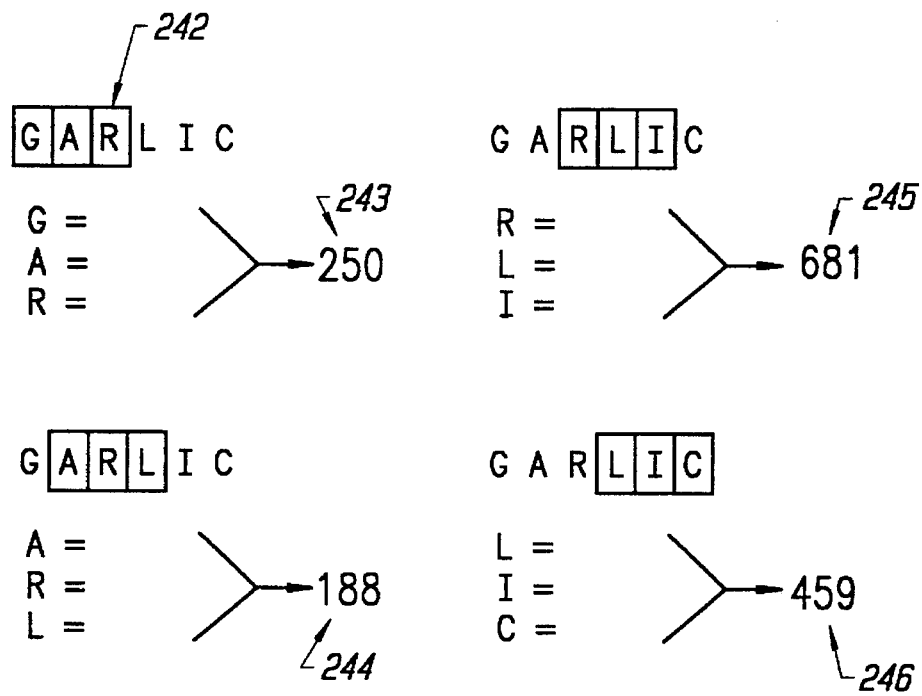
FIGS. 20a and 20b are illustrations detailing how search strings are encoded as trigrams and used in searches according to the present invention.
Figure 20B:
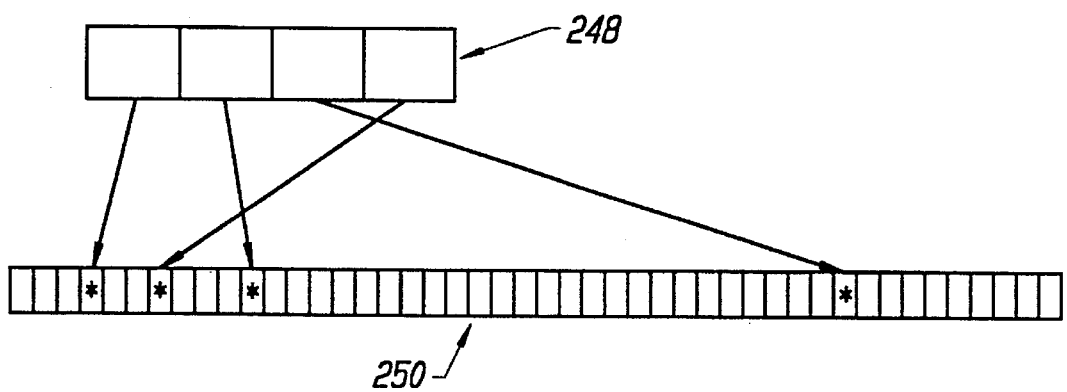

FIGS. 20*a* and 20*b* schematically illustrate the process of encoding a trigram for a search string and comparing the resulting trigrams against hint bits for a content record. As shown in FIG. 20*a*, a three-character frame 242 is moved across a text string (in this case, the word "garlic") to generate the trigram. The first three letters, g, a, r, each have an associated numeric value as shown. In this case, the value for g is 7, the value for a is 1 and the value for r is 18. The distributed sum of these three numeric values gives 250 which is the first entry in the trigram array. The next entry in the trigram array is for the letters a, r, l. As shown, the trigram value for this sequence of characters is 188. The trigram value for the letters r, l, i is 681, and the trigram value for the letters l, i, c is 459. Together, the four values shown at 243, 244, 245, and 246 comprise the trigram array for the text string "garlic". These values are then compared with corresponding bits in a hint bits record.

FIG. 20*b* shows how the hint bits might be used in a search for a character string encoded as an array 248 of four trigrams. The trigram array 248 is compared against hint bits 250 for a hypothetical text content record. The hint bits are checked for occurrences of each entry in trigram array 248. As indicated by the stars in the hypothetical hint bits in this example, each entry for the character string trigram would be found in the hint bits. Under these circumstances, a full text search of the content record associated with hint bits 250 would be conducted.

While this invention has been described in terms of several preferred embodiments, it is contemplated that alterations, modifications and permutations thereof will become apparent to those skilled in the art upon a reading of the specification and study of the drawings. Furthermore, certain terminology has been used for the purposes of descriptive clarity, and not to limit of the present invention. It is therefore intended that the following appended claims include all such alterations, modifications and permutations as fall within the true spirit and scope of the present invention.

What is claimed is:

1. A method by which a first computer system automatically converts a document to an interactive reference that can be interpreted by and displayed on a second computer system having a display screen sensitive to a pointer, a processor in communication with the display screen, and a memory in communication with the processor such that at least portions of the interactive reference residing in the memory can be retrieved by interaction of the pointer with the display screen, the method comprising the following steps:

separating the document into content blocks delineated by content commands within the document, some content blocks containing templates for live interaction between the pointer and the display screen and other content blocks containing text or a picture;

creating page descriptions in which the content blocks are arranged on pages whose boundaries are defined by the display screen of the second computer;

preparing instructions for treating pointer actions on templates displayed on the display screen; and outputting commands describing the interactive reference, the commands having a format, at least when compiled, that can be stored in the memory of the second computer system and interpreted by the processor of the second computer system.

2. The method of claim 1 wherein the templates describe interactive dialog boxes which can be displayed on the display screen of the second computer system, the dialog boxes having one or more icons which when selected with the pointer initiate a live action in the interactive reference.

3. The method of claim 1 wherein the first and second computer systems are provided on different machines.

4. The method of claim 3 wherein the pointer is a stylus in the second computer system.

5. The method of claim 1 wherein the step of creating page descriptions includes the following substeps:

(a) defining a current page having boundaries defined by the display screen of the second computer;

(b) laying out a current content block, as defined by its bounding coordinates, on the current page and determining whether the boundaries of the current block extend beyond the boundaries of the current page, the current block being added to the current page if its boundaries do not extend beyond those of the current page, a new current page being defined if the current block's boundaries do extend beyond those of the current page;

(c) adding some or all of the current block to the new current page if its boundaries extend beyond the boundaries of the current page depending upon whether the current block can be divided between two pages, adding a portion of the current block to the previous current page if the current block can be divided between two pages; and (d) repeating steps (a) through (c) until all content blocks in the document have been evaluated.

6. The method of claim 1 further comprising the following steps:

determining whether each content block defines a new subject; and and incorporating each new subject encountered in a browser.

7. The method of claim 1 wherein at least one of the templates specifies a navigation dialog box having a button for returning to a menu page and another button for creating a bookmark at a specified location in the interactive reference.

8. The method of claim 1 further comprising a step of encoding an array of NGRAMs for at least one of said content blocks.

9. The method of claim 8 wherein the NGRAMs are a trigrams.

10. The method of claim 8 wherein the content block for which the NGRAM is encoded is a text content block.

11. A method by which a first computer system automatically converts a document to an interactive reference that can be interpreted by and displayed on a second computer system having a display screen sensitive to the position of a pointer, a processor in communication with the display screen, and a memory in communication with the processor such that at least portions of the interactive reference residing in the memory can be retrieved by interaction of the pointer with the display screen, the method comprising the following steps:

separating the document into content blocks delineated by content commands within the document, some content blocks containing text or a picture, and at least one other content block containing a template for an interactive navigation dialog box allowing live interaction between the pointer and the display screen;

creating page descriptions in which the content blocks are arranged on pages whose boundaries are defined by the display screen of the second computer, at least one of the page descriptions specifying the structure of a menu page;

linking one or more buttons in the interactive navigation dialog box to other locations in the interactive reference such that when one of the buttons is selected with said pointer, another location within the interactive reference is displayed; and outputting commands describing the interactive reference, the commands having a format, at least when compiled, that can be stored in the memory of the second computer system and interpreted by the processor of the second computer system.

12. The method of claim 11 wherein the navigation dialog box includes a return to menu button which when selected causes a menu page to be displayed.

13. The method of claim 11 wherein the interactive navigation dialog box includes a bookmark button which when selected marks the currently displayed page.

14. The method of claim 11 wherein the step of creating page descriptions includes the following substeps:

(a) defining a current page having boundaries defined by the display screen of the second computer;

(b) laying out a current content block, as defined by its bounding coordinates, on the current page and determining whether the boundaries of the current block extend beyond the boundaries of the current page, the current block being added to the current page if its boundaries do not extend beyond those of the current page, a new current page being defined if the current block's boundaries do extend beyond those of the current page;

(c) adding some or all of the current block to the new current page if its boundaries extend beyond the boundaries of the current page depending upon whether the current block can be divided between two pages, adding a portion of the current block to the previous current page if the current block can be divided between two pages; and (d) repeating steps (a) through (c) until all content blocks in the document have been evaluated.

15. The method of claim 11 further comprising the following steps:

determining whether each content block defines a new subject; and and incorporating each new subject encountered in a browser.

16. The method of claim 11 further comprising a step of encoding an array of NGRAMs for at least one of said content blocks.

17. A computer system for automatically converting a document to an interactive reference that can be interpreted by and displayed on a stylus-based second computer system having a display screen sensitive to a stylus, a processor in communication with the display screen, and a memory in communication with the processor such that at least portions of the interactive reference in the memory can be retrieved by interaction of the stylus with the display screen, the computer system comprising:

processor means;

memory means in communication with the processor means;

means for separating the document into content blocks delineated by content commands within the document, some content blocks containing templates for live interaction between the stylus and the display screen of the second computer system and other blocks of content containing text or a picture;

means for creating page descriptions in which the content blocks are arranged on pages whose boundaries are defined by the display screen of the second computer system;

means for preparing instructions for treating stylus actions on templates displayed on the screen display of the second computer system; and means for outputting commands describing the interactive reference, the commands having a format, at least when compiled, that can be stored in the memory of the second computer system and interpreted by the processor of the second computer system.

18. The system of claim 17 wherein at least one of the templates describes a navigation dialog box containing a plurality of buttons for navigating throughout the interactive reference.

19. The system of claim 18 wherein at least one of the buttons within the navigation dialog box creates a bookmark when selected by said stylus.

20. The system of claim 17 further comprising means for encoding an array of NGRAMs from text content records.

21. The system of claim 20 wherein the NGRAMs are trigrams.

22. A method by which a first computer system automatically converts a document to an interactive reference that can be interpreted by and displayed on a second computer system having a display screen sensitive to a pointer, a processor in communication with the display screen, and a memory in communication with the processor such that at least portions of the interactive reference residing in the memory can be retrieved by interaction of the pointer with the display screen, the method comprising the following steps:

separating the document into content blocks delineated by content commands within the document, some content blocks containing templates for live interaction between the pointer and the display screen and other content blocks containing text or a picture;

creating page descriptions in which the content blocks are arranged on pages whose boundaries are defined by the display screen of the second computer;

preparing instructions for treating pointer actions on templates displayed on the display screen; and outputting commands describing the interactive reference including the page descriptions, the commands having a format, at least when compiled, that can be stored in the memory of the second computer system and interpreted by the processor of the second computer system.

23. The method of claim 22 wherein the templates describe interactive dialog boxes which can be displayed on the display screen of the second computer system, the dialog boxes having one or more icons which when selected with the stylus initiate a live action in the interactive reference.

24. The method of claim 22 wherein the first and second computer systems are provided on different machines.

25. The method of claim 24 wherein the pointer is a stylus in the second computer system.

26. The method of claim 22 wherein the step of creating page descriptions includes the following substeps:
   (a) defining a current page having boundaries defined by the display screen of the second computer;
   (b) laying out a current content block, as defined by its bounding coordinates, on the current page and determining whether the boundaries of the current block extend beyond the boundaries of the current page, the current block being added to the current page if its boundaries do not extend beyond those of the current page, a new current page being defined if the current blocks boundaries do extend beyond those of the current page;
   (c) adding some or all of the current block to the new current page if its boundaries extend beyond the boundaries of the current page depending upon whether the current block can be divided between two pages, adding a portion of the current block to the previous current page if the current block can be divided between two pages; and
   (d) repeating steps (a) through (c) until all content blocks in the document have been evaluated.

27. The method of claim 22 further comprising the following steps:
   determining whether each content block defines a new subject; and
   and incorporating each new subject encountered in a browser.

28. The method of claim 1 wherein at least one of the templates specifies a navigation dialog box having a button for returning to a menu page and another button for creating a bookmark at a specified location in the interactive reference.

29. A computer system for automatically converting a document to an interactive reference that can be interpreted by and displayed on a stylus-based second computer system having a display screen sensitive to a stylus, a processor in communication with the display screen, and a memory in communication with the processor such that at least portions of the interactive reference in the memory can be retrieved by interaction of the stylus with the display screen, the computer system comprising:
   processor means;
   memory means in communication with the processor means;
   means for separating the document into content blocks delineated by content commands within the document, some content blocks containing templates for live interaction between the stylus and the display screen of the second computer system and other blocks of content containing text or a picture;
   means for creating page descriptions in which the content blocks are arranged on pages whose boundaries are defined by the display screen of the second computer system;
   means for preparing instructions for treating stylus actions on templates displayed on the screen display of the second computer system; and
   means for outputting commands describing the interactive reference including the page descriptions, the commands having a format, at left when compiled, that can be stored in the memory of the second computer system and interpreted by the processor of the second computer system.

30. The system of claim 29 wherein at least one of the templates describes a navigation dialog box containing a plurality of buttons for navigating throughout the interactive reference.

31. The system of claim 30 wherein at least one of the buttons within the navigation dialog box creates a bookmark when selected by said stylus.

* * * * *